US011880394B2

(12) United States Patent
Zamfir et al.

(10) Patent No.: US 11,880,394 B2
(45) Date of Patent: Jan. 23, 2024

(54) SYSTEM AND METHOD FOR MACHINE LEARNING ARCHITECTURE FOR INTERDEPENDENCE DETECTION

(71) Applicant: ROYAL BANK OF CANADA, Toronto (CA)

(72) Inventors: Roxana Zamfir, Toronto (CA); Atique Badar-E-Munir, Toronto (CA); Ivana Wright, Toronto (CA); Mohammadreza Dadkhah, Toronto (CA); Guhan Pattamadai Kashyap, Toronto (CA); Ananya Roy, Toronto (CA); Diane Elizabeth Fenton, Toronto (CA); Hang Peng, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 608 days.

(21) Appl. No.: 17/013,119

(22) Filed: Sep. 4, 2020

(65) Prior Publication Data
US 2021/0073247 A1    Mar. 11, 2021

Related U.S. Application Data

(60) Provisional application No. 62/897,007, filed on Sep. 6, 2019.

(51) Int. Cl.
*G06Q 10/00*    (2023.01)
*G06F 16/28*    (2019.01)
(Continued)

(52) U.S. Cl.
CPC .......... *G06F 16/288* (2019.01); *G06F 40/295* (2020.01); *G06N 5/04* (2013.01);
(Continued)

(58) Field of Classification Search
None
See application file for complete search history.

(56) References Cited

U.S. PATENT DOCUMENTS 10,733,619 B1 *   8/2020   Newman ............ G06Q 30/0201
2019/0163736 A1 *   5/2019   Sharma ................. G06F 16/951
2019/0354544 A1 * 11/2019   Hertz ...................... G06F 16/35

OTHER PUBLICATIONS

Sejal Jaiswal, Python Tuples Tutorial, Feb. 2018, www.DataCamp.com (Year: 2018).*

(Continued)

*Primary Examiner* — Naresh Vig
(74) *Attorney, Agent, or Firm* — Norton Rose Fulbright Canada LLP

(57) ABSTRACT

A system for generating predictions associated with interdependence detection between a plurality of data objects, each data object of the plurality of data objects corresponding to an entity name, the system processing, using a natural language processing engine, text strings to extract entity names associated with each of the text string; processing, using a machine learning engine, the text strings to extract estimated economic relationships identified between at least two different entity names. The estimated economic relationships are aggregated for each pair of entity names to establish of potential interdependence between the pair of entity names. An output data structure is generated based at least on the aggregated estimated economic relationships.

20 Claims, 22 Drawing Sheets

(51) Int. Cl.
   *G06N 5/04*     (2023.01)
   *G06N 20/00*    (2019.01)
   *G06F 40/295*   (2020.01)
   *G06Q 10/10*    (2023.01)
   *G06Q 30/0201*  (2023.01)
   *G06Q 40/03*    (2023.01)

(52) U.S. Cl.
   CPC ............ *G06N 20/00* (2019.01); *G06Q 10/10* (2013.01); *G06Q 30/0201* (2013.01); *G06Q 40/03* (2023.01)

(56) References Cited

OTHER PUBLICATIONS

Michael Lin, Cosine Similarity & Classification, Aug. 28, 2018, www.linkedin.com (Year: 2018).*

Chuck Dishmon, Named Entity Recognition with Standard NER Tagger, Nov. 19, 2015, printed through www.archive.org (Year : 2015).*

\* cited by examiner

FIG. 15

SYSTEM AND METHOD FOR MACHINE LEARNING ARCHITECTURE FOR INTERDEPENDENCE DETECTION

CROSS-REFERENCE

This application is a non-provisional of, and claims all benefit including priority to, U.S. Application No. 62/897,007, filed 2019 Sep. 6, entitled "SYSTEM AND METHOD FOR MACHINE LEARNING ARCHITECTURE FOR INTERDEPENDENCE DETECTION", incorporated herein by reference in its entirety.

FIELD

Embodiments of the present disclosure generally relate to the field of machine learning, and more specifically, embodiments relate to devices, systems and methods for machine learning architectures for interdependence detection between data objects.

INTRODUCTION

Determining interdependence between data objects is a challenge, especially when the data sets are large and the interconnections are complex between individual data objects.

For example, the interdependence may be determined through traversal of multiple links as between data objects which may not be readily apparent to an observer. Accordingly, determining these interdependencies is a computationally complex endeavor. A driver for establishing detecting these interdependence relationships includes the large exposure framework requirements (LEF).

The LEF regulation requires the reporting of large exposures and the monitoring of related limits as applied to an institution's aggregate exposure value to a counterparty or group of connected counterparties. Counterparties can be connected based on control relationships and/or economic interdependence.

When the exposure to an individual counterparty exceeds 5% of an institution's Tier 1 Capital, institutions are expected to perform a thorough investigation to identify possible counterparties connected by economic interdependence. Examples of economic interdependence include scenarios where one counterparty gets 50% or more of its revenues from an another counterparty, or where the financial difficulties of one counterparty would cause difficulties for the other counterparty in terms of full and timely repayment of liabilities.

SUMMARY

In some embodiments, a system and method for machine learning architecture for interdependence detection is proposed that utilizes specific machine learning artificial intelligence technical solutions for determining interdependence between data objects, for example to identify economic relationships between counterparties. Natural Language Processing (NLP) approaches are used in some embodiments to extract entity names and relationships from textual data and Machine Learning (ML) techniques are used to detect relationships with significant economic interdependence.

In particular, a computer implemented approach is utilized that is configured to receive a set of input data sets comprising text data (e.g., unstructured text) relating to information or events having relevance to a plurality of entities, and to automatically generate output data structures representative of automatically estimated interconnections as between the entities such that the output data structures can be consumed by downstream systems to generate notifications, generate reports based on an estimated level of exposure, among others. The automatically generated output data structures represent linkages as between entities and entity names that may not be otherwise apparent, and are utilized as a supporting computer-based tool to aid in risk or exposure analysis through automatic analysis of voluminous text based data. As described further, specific architectures, methods, and processes for artificial intelligence and natural language processing techniques are utilized to conduct this automatic analysis.

Machine Learning (ML), a subset of artificial intelligence (AI), is the science of using statistical techniques to give computers the ability to "learn" from data, identify patterns and make decisions without being explicitly programmed. Natural language processing (NLP) is a branch of artificial intelligence that helps computers recognize, read and interpret human language in the form or text or speech.

Embodiments described herein are adapted to help an institution (e.g., a financial institution) to identify the economic relationships in a timely manner and meet various regulatory deadlines. This is technically challenging as the relationships are not readily ascertainable, and it is difficult to map the inter-relationships as between entities. In particular, Applicants propose AI-based computer implemented approaches that are adapted to parse through large data sets of textual information to identify and estimate relationships thereof. For example, the textual data can include data from the Newton system can be used as the main data set used by the AI models as it includes risk assessments and commentary for all wholesale borrowers.

These AI-based computer implemented approaches use specially configured computer hardware and software, and in some embodiments, are special purpose machines such as computing equipment or servers that are adapted to communicate with upstream and downstream devices through one or more message buses, receiving input data sets representative of company information, and process the information to generate output data sets The Newton system is a system that is adapted to capture data obtained from employees that is utilized by NLP/ML models. Newton is a web-based application and is used to determine the Borrower Risk Rating (BRR) and/or Single Name Risk Rating (SNRR) for non-scored companies. Newton is used by Account Managers and Credit Officers globally to perform the risk rating component of the Credit Application process. Additionally, the data collected during this process is subjected to ongoing analysis and evaluation to validate the models used within Newton in the determination and assessment of risk.

The Borrower Risk Rating (BRR) is a forward looking assessment of the likelihood that a borrower will default on its credit obligations (i.e., its Probability of Default) over a three-year term. All wholesale borrowers must be assigned a rating from a BRR scale. BRR is assigned to the wholesale borrowers (e.g., in the banking and trading book) where a financial institution has a direct lending relationship with the client.

In accordance with a first aspect, a system for generating predictions associated with interdependence detection between a plurality of data objects, each data object of the plurality of data objects corresponding to an entity name is provided.

The system can include a data receiver configured to receive a plurality of text strings, each text string of the plurality of text strings representing a textual comment from source input data representing risk assessment framework text strings each associated with an entity and a computer processor operating in conjunction with computer memory.

The computer processor is configured to process, using a natural language processing engine, the plurality of text strings to extract entity names associated with each of the text string of the plurality of text strings; process, using a machine learning engine, the plurality of text strings to extract estimated economic relationships associated with each of the text string of the plurality of text strings, the estimated economic relationships identified between at least two different entity names; aggregate the estimated economic relationships for each pair of entity names of the plurality of entity names, the aggregated estimated economic relationships indicative of potential interdependence between the pair of entity names; and generate an output data structure based at least on the aggregated estimated economic relationships for at least one pair of entity names.

In another aspect, the natural language processing is conducted using a Stanford Named Entity Recognizer model data architecture.

In another aspect, the machine learning converts portions of the plurality of text strings representing the extract estimated economic relationships into vector representations.

In another aspect, the vector representations are pre-processed during generation to stem words to root forms of the words, to remove stop words, and to remove words that either appear often in the text or rarely in the text.

In another aspect, the vector representations are based at least on term frequency—inverse document frequency representations having at least a first portion representing a term frequency indicative of how often a word appears in a comment text string and a second portion representing a document frequency which is determined by dividing a total number of comments divided by how many comments the word appears in and conducting a natural logarithm of results of the division.

In another aspect, a hyperparameter for generating the term frequency—inverse document frequency representations are optimized by the machine learning engine.

In another aspect, the estimated economic relationships are generated by a classifier engine that is adapted to append metadata to the vector representations based on a classification data model architecture including at least one of economic relationship label, confidence level, and a list of important feature words, the appended vector representations utilized to generate the output data structure.

In another aspect, the output data structure is cross referenced against client names stored in an enterprise business record data structure using a cosine similarity algorithm to generate estimated high exposure lists for the client names stored in the enterprise business record data structure.

In another aspect, a cross join is used for matching the client names against the extracted entity names.

In another aspect, the output data structure is pre-filtered to remove candidate pairs below a threshold value of cosine similarity.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 15 and FIG. 16 provide sample textual fields and criteria, according to some embodiments.

FIG. 15 shows example types of textual fields, including comments, summaries, profiles, among others.

FIG. 16 shows various criteria coupled to textual comments.

DETAILED DESCRIPTION

Figure 1A:
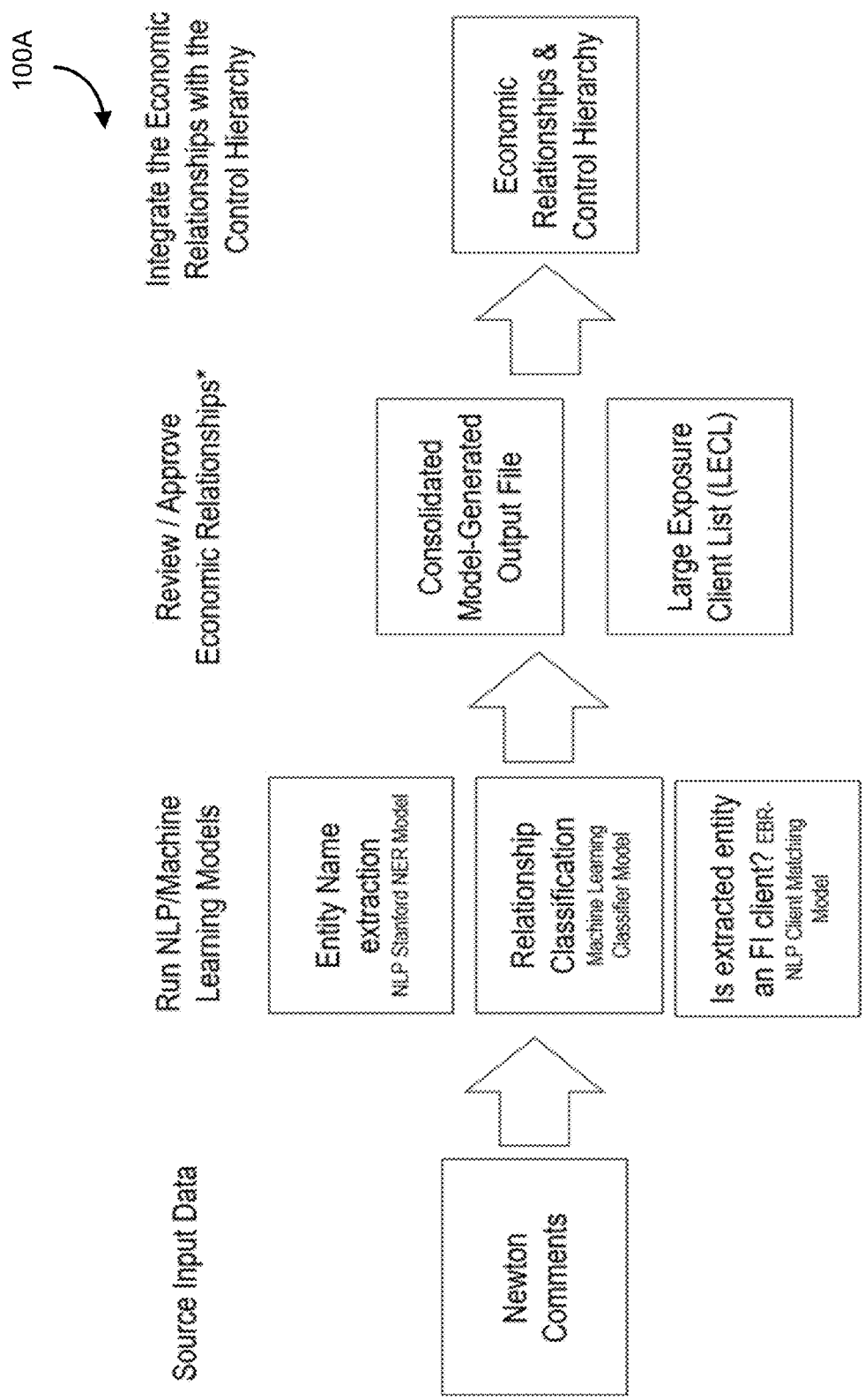
FIG. 1A is a block schematic diagram of an example data flow for interdependence detection between data objects, in accordance with some embodiments.

Determining interdependence between data objects is a technical challenge, especially when the data sets are large and the interconnections are complex as between individual data objects.

A system and method for machine learning architecture for interdependence detection is proposed that utilizes specific machine learning artificial intelligence technical solutions for determining interdependence between data objects, for example to identify economic relationships between counterparties. The systems described herein are intended to be computer implemented systems that, in some embodiments, are special purpose machines that are adapted for automated processing of input data sets to generate output data sets using model architectures described herein.

In particular, an experimental processing engine was utilized to process 6.5 million records extracted by the NLP model based on data from 2011 to 2019; the records representing relationships and corresponding comments that were extracted from all Newton RAFs. 2.1 million unique entity pairs were extracted (WHEATON GMC BUICK CADILLAC LTD. & GM and WHEATON GMC BUICK CADILLAC LTD. & General Motors would be considered unique pairs), and 669,000 unique entity names were extracted by the NLP model.

RAF stands for Risk Assessment Framework. Risk assessments and BRR assignments for Non-scored Business Borrowers can be performed using Criteria Papers.

Risk Criteria Papers are tools that help focus risk assessment activities on critical issues and ensure risk assessment is performed in a consistent and transparent manner.

Risk Criteria Papers:
Identify Key Risk Factors associated with business entities operating in an industry;
Identify Criteria with which to evaluate the level of risk in each Risk Factor;
Specify how to evaluate a Borrower's business and financial performance relative to the Criteria within each Risk Factor in order to determine a risk rating.
Criteria papers are categorized as:
Industry-specific
Product specific
High net worth and personal investment companies
General During development, 3 pre-trained NLP algorithms were tested to recognize and extract entity names from unstructured data. Stanford's Named Entity Recognizer (NER) model was selected as it provided the highest accuracy; i.e., the entity recognition accuracy was ~82% (based on 13,657 Newton records analyzed out of 226,662). The Stanford NER model, also known as CRFClassifier, is trained in particular for 3 classes: PERSON, ORGANIZATION, LOCATION.

The Economic Relationship Classifier (ERC) described herein in some embodiments utilizes the output of the NER model to classify the relationships into three classes: Significant Economic Relationship, Non-significant Economic Relationship, and Other.

In development, other models were tested to develop the classifier including: decision trees, random forest, support vector classifiers, and multi-layer perceptron classifiers. The model with higher accuracy and higher recall score on the significant economic class has been selected as the baseline model at this stage. In particular, random forest was found to be particularly useful, in an embodiment.

In machine learning, the priority is to have a high recall for "Significant economic relationship" and "Non-significant economic relationship". Then, among the models with the good recall, the system picks the model with higher precision on these two labels.

The performance metrics for the decision tree and the random forest models were better compared to other models (better precision and recall scores). To make sure that the model is interpretable, the approach could use decision tree as an interpretable model or use random forest and then train a white-box estimator based on that to interpret the model.

The white-box estimator is a second model which is interpretable and can provide explanation for the non-interpretable (black-box) estimator. To train the white-box estimator, a new dataset is generated for each sample in the original dataset by perturbing the sample (e.g., randomly deleting some of the words in the text). Then, the black-box estimator is used to get target values for each sample in the new dataset.

The white-box estimator is trained on the new dataset and explanation provided by the white-box estimator is used to interpret the behaviour of the black-box estimator for the original sample. In some embodiments, the approach used a machine learning debugging (e.g., an Eli5) package which uses LIME algorithm to train a white-box estimator for each sample.

However, using the white-box estimator for each sample in inference time is computationally expensive. Based on the performance metrics, the benefits of using random forest over decision trees in not high enough to justify the extra computation cost for using white-box estimator for each sample. So, the system utilizes, in some embodiments, decision trees and try to optimize the depth of the tree as the hyperparameter for optimizing performance.

FIG. 1A is a block schematic diagram 100A of an example data flow for interdependence detection between data objects, in accordance with some embodiments.

An overview of the artificial intelligence solution is shown, whereby source input data is processed through a series of natural language processing and machine learning models to establish one or more output data structures (e.g., model generated output files). The consolidated model-generated output file is then joined with the organization's Large Exposure Client List (LECL) which consists of clients with an exposure >4-5% of the Organization's Tier 1 Capital. Ultimately, only the relationships related to the LECL are required for meeting the regulatory requirement. Note that the clients on the LECL can change month over month.

The economic relationships extracted by the natural language processing and machine learning models are then integrated with the organization's control hierarchy also known as the Single Name/Borrower hierarchy of relationships. These relationships, for example, can be indicative of potential economic interdependence.

The output data structure generated by the system is a data object having linkages between the at least one pair of entity names forming a group of connected counterparties. The linkages can be provided in the form of the confidences scores stored in a multi-dimensional array variable object, or in another embodiment, in the form of directed linked objects, such as a linked list of data objects represented using pointers between memory locations. In another embodiment, the output data structure can utilize binary-type interconnections simplified based on relationships greater or below a pre-defined threshold for interdependence. Such a simplified data structure is easier to generate and process, but provides less granularity to a downstream system.

This output data structure can be automatically generated and can be representative of various groups as noted below based on automatically generated or determined economic relationships.

The output data structure can be stored on a data repository or communicated to a downstream system on a message bus or other type of output interface such that the downstream system is able to receive the automatically generated estimated interconnections and conduct further analyses, such as identifying exposure levels based on the interconnections, among others.

Example: A and B are holding companies of two separate groups, and the only economic interdependence relationship that exists is between B1 and A, where B1 is economically dependent on A (i.e., one-way relationship).

Figure 1B:
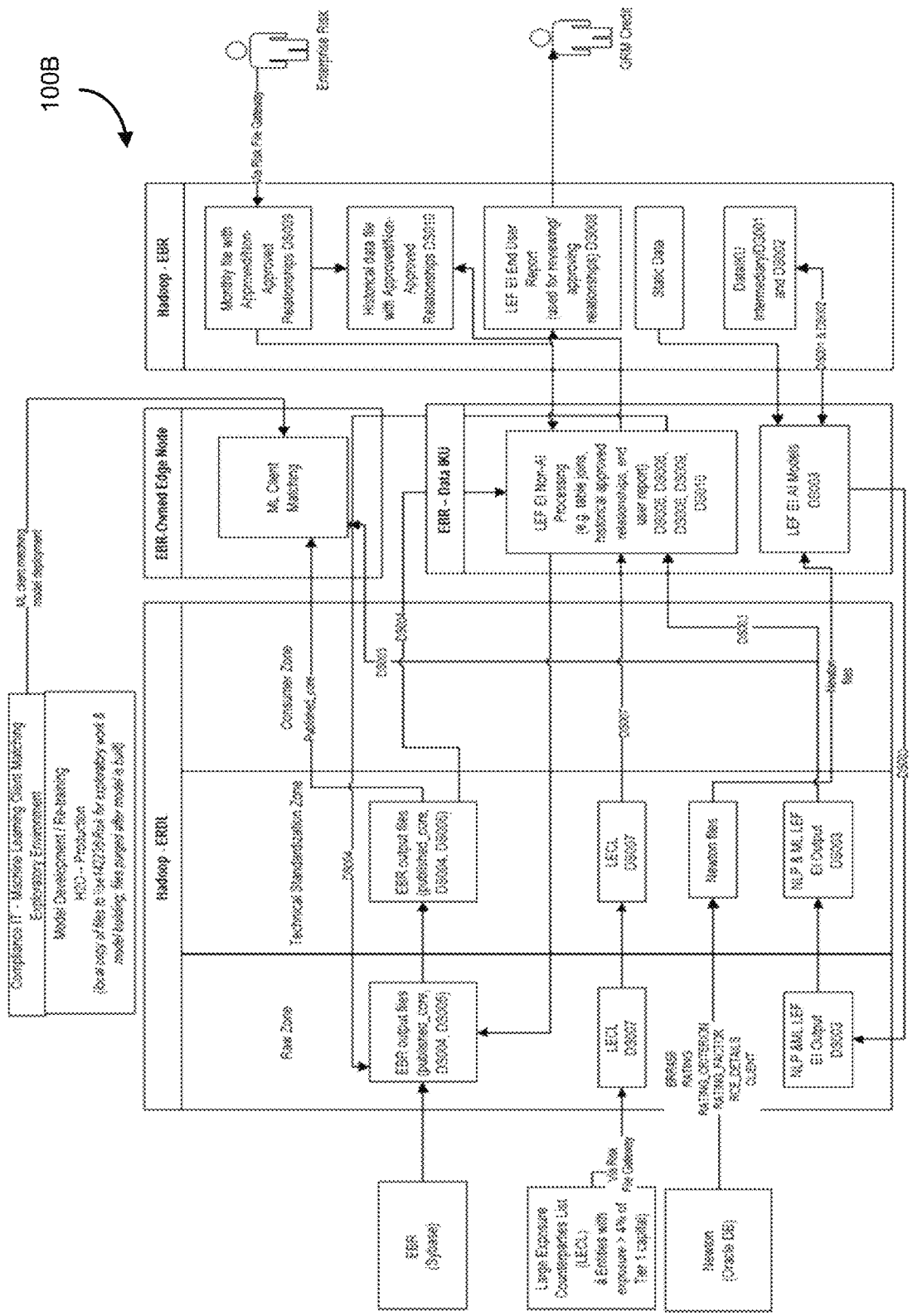
FIG. 1B is a more detailed block schematic diagram of an example data flow for interdependence detection between data objects, in accordance with some embodiments.
Figure 1C:
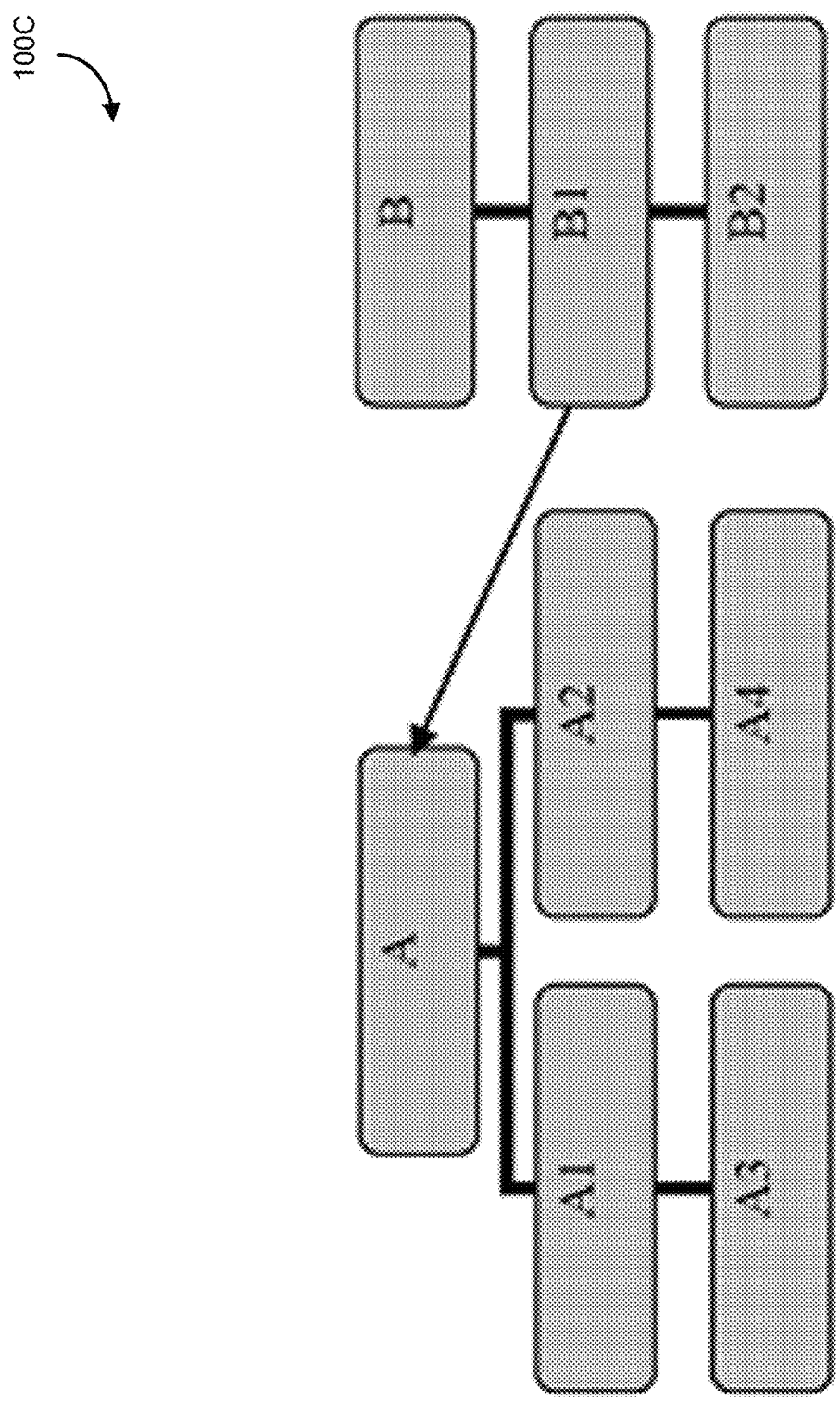
FIG. 1C is a block schematic diagram of an example system for interdependence detection between data objects, in accordance with some embodiments.

This is shown in diagram 100C of FIG. 1C.

Figure 1D:
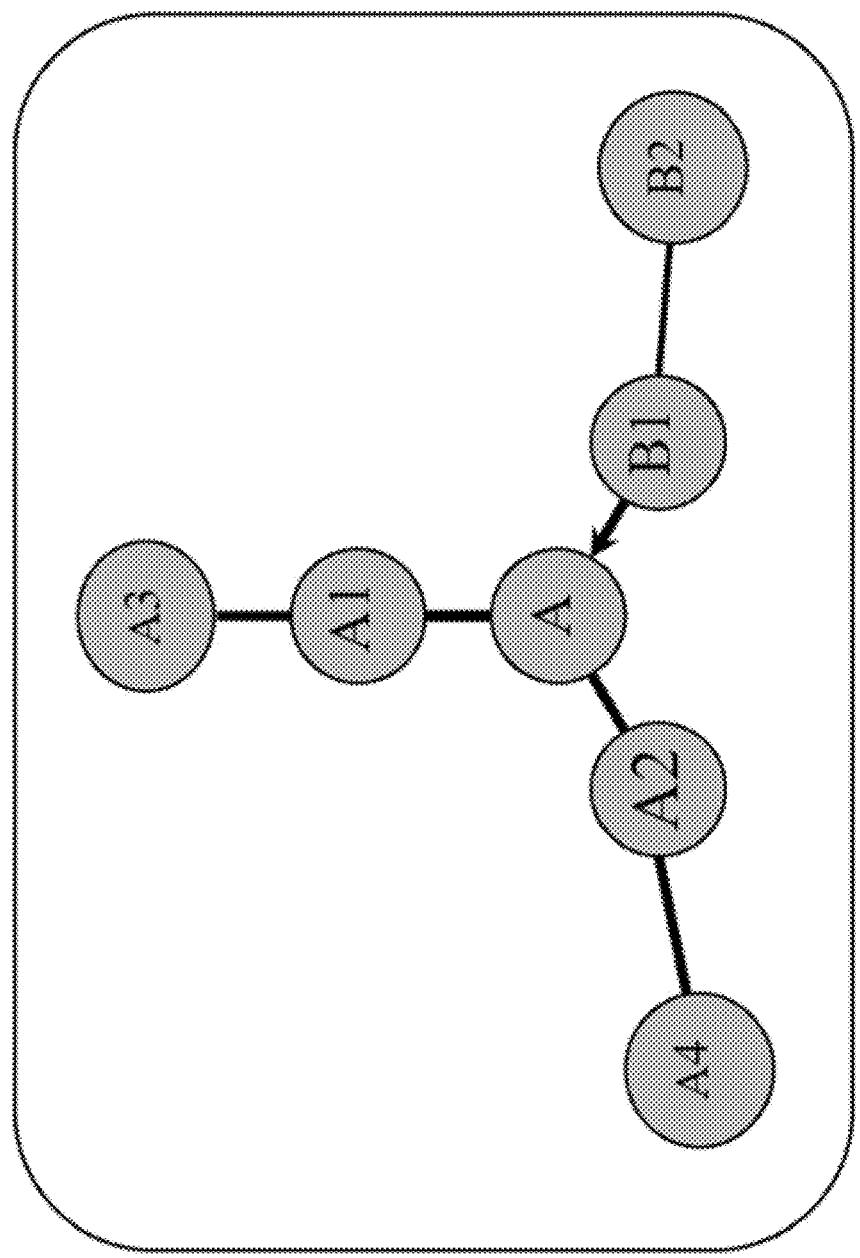
FIG. 1D is an illustrative nodal diagram showing various counterparties represented as circular nodes (A, A2, A3, A4, B1, B2) and their relationships as nodal interconnections, according to some embodiments.

If the institution has exposures to all counterparties in the diagram (A, A1, A2, A3, A4, B, B1, and B2), then the following groups should be formed, as shown in diagram 100D of FIG. 1D.

In Group 1, B1 and B2 (a subsidiary of B1) should be included in the group of connected counterparties of A given a potential contagion effect of financial difficulties from A to B1 and B2.

Figure 1E:
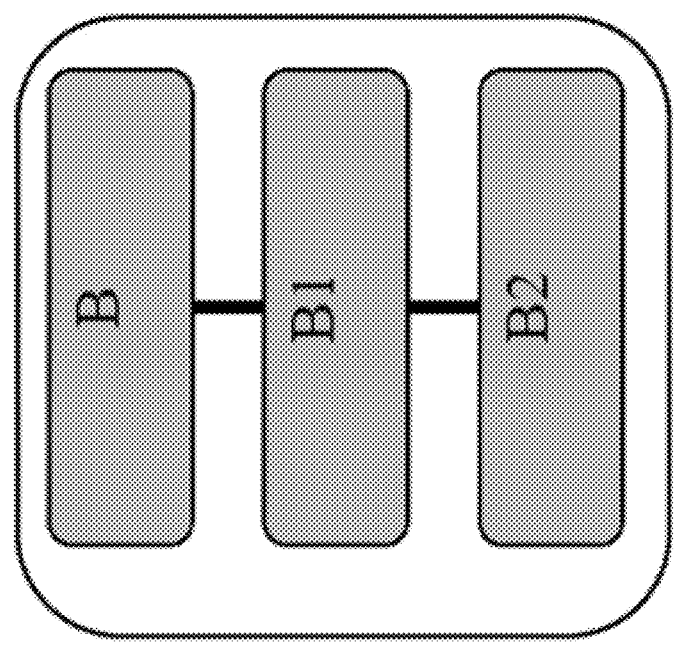
FIG. 1E is an illustrative nodal diagram showing various counterparties represented as circular nodes (B, B1, B2) and their relationships as nodal interconnections, according to some embodiments.

In Group 2 (shown in diagram 100E of FIG. 1E), given that A does not rely economically on B1, the group of connected counterparties of B1 does not need to include A, since the financial difficulties of B1 are unlikely to lead to the financial difficulties of A. However, B+B1+B2 should form a group of connected counterparties based on control relationships.

The grouping approach can include of the following steps, in an embodiment. The steps are shown as examples, and other, alternate, different steps are possible.

Dataset preparation: The model takes as input five Newton tables: rating, rating_criterion, rating_factor, BRR456, and RCE_details. Each row in each of these datasets represents one client, and may have more than one comment in it. The system loads these tables into memory, then uses functions from Python to combine the five Newton tables into the input dataset where each row represents a single comment.

Figure 10:
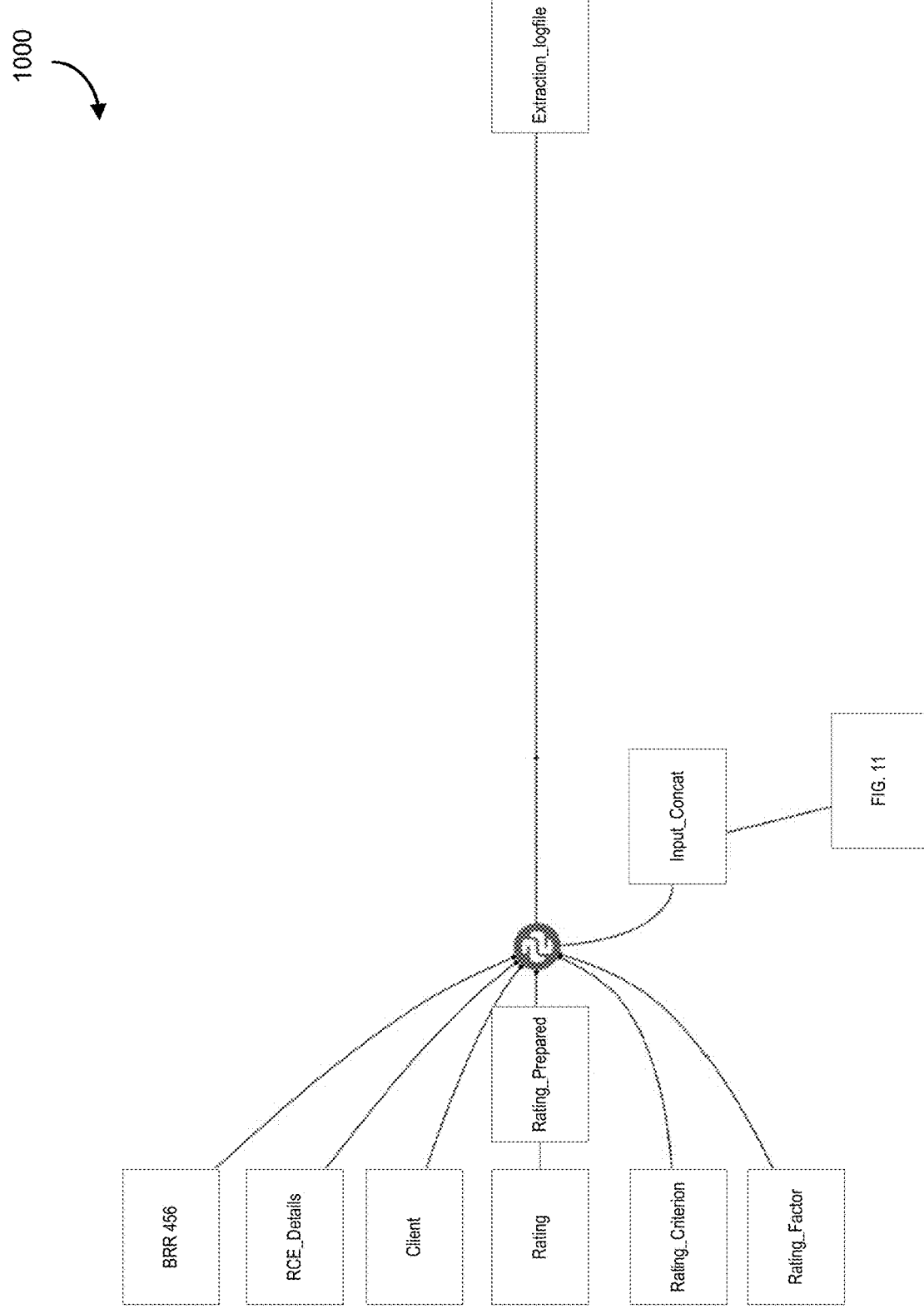
FIG. 10 is an example block schematic showing inputs for data set preparation, according to some embodiments.

FIG. 10 is an example block schematic 1000 showing example inputs for data set preparation, according to some embodiments. These inputs are provided into the named entity extraction of FIG. 11.

Named Entity Extraction: In this step, the system applied a NER package to find the words that represent an organization. The output of this step is a label for each word in the comment as either "Organization" or "Other".

Figure 11:
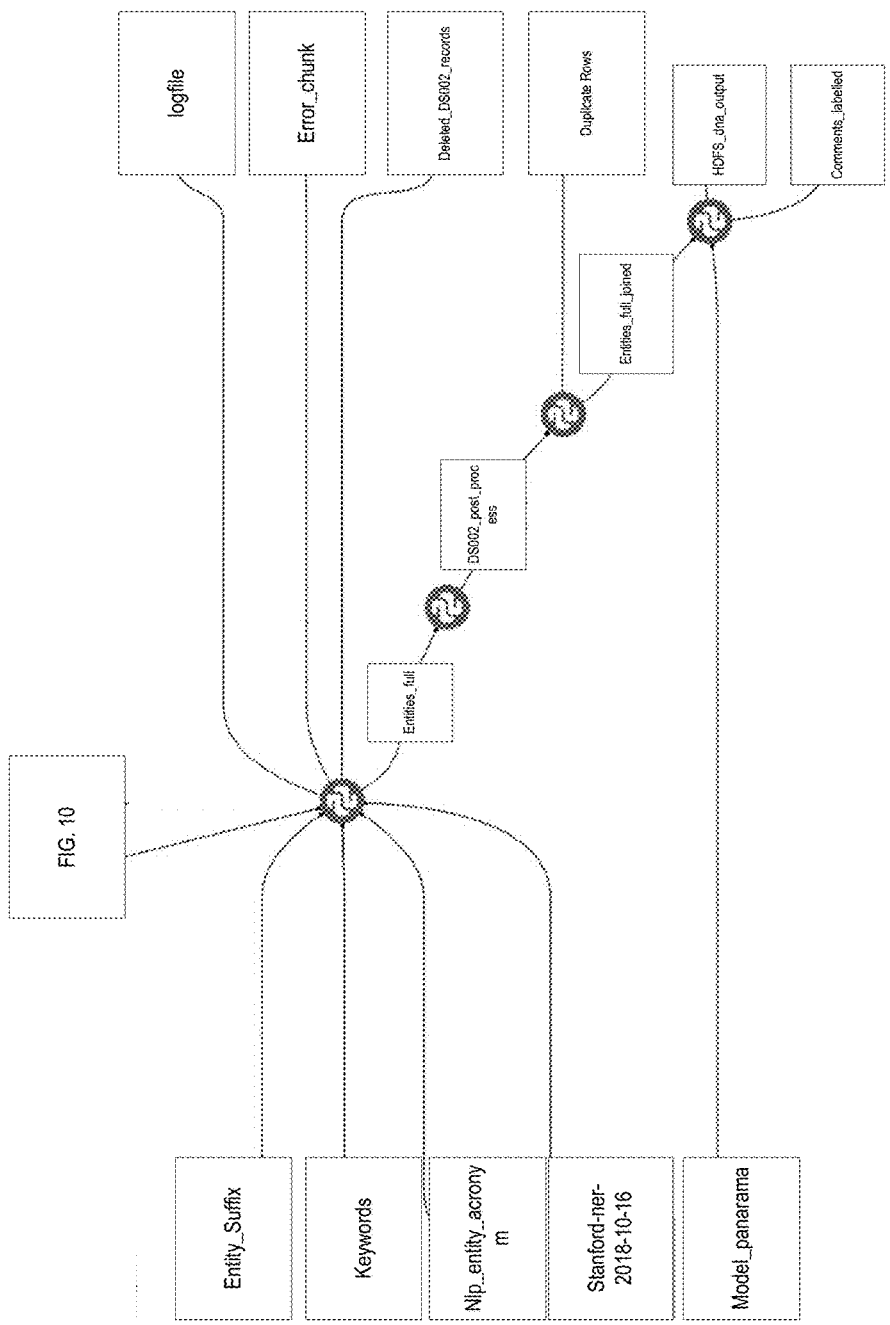
FIG. 11 is an example block schematic showing example inputs for the named entity extraction, according to some embodiments.

FIG. 11 is an example block schematic 1100 showing example inputs for the named entity extraction, according to some embodiments. As noted in FIG. 11, input features are received from the above prepared data set from FIG. 10.

Figure 12:
FIG. 12 shows example code for conducting text classification using the NER package, according to some embodiments.

FIG. 12 shows example code 1200 for conducting text classification using the NER package.

NER Post processing & classifier: To generate the final output, the system processes all words tagged having a tag, such as "Organization". To extract entities that are more than one word, the system in this example detects consecutive words tagged as "Organization" and combines them.

There are certain entities of the form 12345678 Ontario Inc. (a number+a province+optionally Inc or Ltd) that are not recognized by the NER package. To deal with those, the system used regular expressions to detect and label entities that follow the above pattern.

If an entity is mentioned more than once in a comment, it is possible that the system has extracted it more than once. Any duplicate entities for the same comment are removed and stored in a different table in case reference is necessary. Finally, once the system arrives at a list of entities, and generates the output dataset, where each row is a comment/entity pair.

Classifier: After extracting the entities from the text for each row in Newton data, the system selects all the unique comments to classify the relationships into three classes: Significant Economic Relationship, Non-significant Economic Relationship, and Other.

The current definition of a Significant Economic Relationship is very stringent (e.g. receiving 40% of revenue from a single entity is not considered significant, but 50% or more is) and as a result, the majority of relationships identified are not significant.

Figure 13:
FIG. 13 is a screenshot that shows the distribution of Significant, Non-significant and Other relationships identified by the model, according to some embodiments.

FIG. 13 is a screenshot 1300 that shows the distribution of Significant, Non-significant and Other relationships identified by the model, according to some embodiments. FIG. 13 is an example output of the system whereby a graphical user interface is controlled to render graphical interface components on a display, such as bar charts, numerical values rendered as text, among others.

Vector representation of the text, maximum dollar value and percentage value mentioned in the text, Rating_Final (from Newton data), and Model_Name (from Newton data), have been used as features for the model. The classifier uses the comment, Model_Name, and Rating_Final columns as the inputs. To create the vector representation, first the system removed digits and special characters like punctuation or brackets from the text.

Next, the system stems words to their roots. For example, "manage", "manager", "management", and "managing" all have related meanings and would all be stemmed to their common root "manag-". Then, the system removes what are known as stop words. These are words that do not contribute any meaning to the text. In English, common stop words are "a", "the", "me", "until", and so on.

Finally, the system removes words that appear very often in the text, or very rarely. This is because they are so common (or rare) that their presence does not indicate anything about the meaning of the text. Once the text has been preprocessed, the system chooses a representation of the text to convert it from human language to a vector of numbers that the system can understand.

The representation that the system uses is called Term Frequency—Inverse Document Frequency, or TF-IDF. TF-IDF is comprised of two parts. The first, term frequency, counts how often each word appears in a comment.

For example, if the comment is "the approver did not approve the reconciliation", the term "approv-" has frequency 2 ("approver" and "approve") and the term "reconcil-" has frequency 1 ("reconciliation"). The second part of TF-IDF deals with document frequency, which is determined by taking total comments divided by how many comments the term appears in, and then taking the natural log of that result.

For example, if the system has received 100 comments total, and 50 of them had the term "approv-" in it somewhere, the document frequency for this term would be In (100/50) 0.69. To calculate the TF-IDF for a term, the system divides the term frequency by the document frequency (which is the same as multiplying the term frequency by the inverse of the document frequency; hence the name TF-IDF). In the example, this would mean that the TF-IDF for the term "approv-" is 2/0.69≈2.89. A higher TF-IDF usually indicates that the term is important for the issue being examined.

The approach for creating the vector representation impacts the overall performance of the classifier, so the system is adapted to optimize the hyperparameter involved in text processing and the TF-IDF vector generation to ensure that the system gets the best vector representation for the classifier.

The classifier will then create three extra columns for each row (or extra rows for each columns depending on how the data is formatted) in the input data: Economic relationship label, confidence level, and list of the important feature words. These six columns are then joined back to the entire Newton data with extracted entity to create the final output. To make sure the system doesn't load the entire dataset into the memory, the system runs the classification and join operation for one chunk of the data at a time.

The system reads one chunk of the data into the memory, the system selects the unique comments, the system extracts the features, the system runs the classifier for the comments, the system joins back the results to the original chunk and the system saves the resulting data structure into the Hadoop cluster.

Final Post Processing—NER & Classifier: The final file is written with specific headers, separators, and trailers for it to be ingested into the Hadoop data lake. To do this, the system "chunks" the data, meaning that the system reads a certain number of rows of the input, apply the formatting, write those formatted rows to the output, and then repeat. This has the advantage of saving memory costs. To do the formatting, the system applies transformations according to the requirements; for example, the columns needed to be separated by the pipe character (I) with each data element enclosed in quotation marks.

Client Matching: The current method (generating candidate pairs using a cross join, then calculating features) for matching the entity name extracted by the NLP process and wholesale client names stored in EBR is using the cosine similarity algorithm.

Key technical challenges on this component had to do with the large volumes of data required. This particular component uses a cross join to determine candidate pairs for matching. However, unlike a client matching module, this approach does not use delta matching process only (i.e., match only client records added over the past week) to reduce the amount of pairs to check—it does a full check of the entire datasets every time (e.g. 600,000 entities extracted by the NLP model against close to 1.5 million client profiles)—which significantly increases the number of candidate pairs for every run.

To handle the very large number of candidate pairs in the cross-join, a pre-filter was implemented. This pre-filter was applied by removing candidate pairs below a certain value of cosine similarity immediately before any other calculations were applied. This resulted in a significant boost to performance and allowed the component to complete successfully with full data sets (no deltas).

Other techniques were also implemented to reduce memory usage—such as determining the minimal set of features required and reducing the amount of columns in the Spark Dataframes. This allowed the system to maximize the amount of YARN resources that the system had available and allow the runs to complete in all environments—even with limited resources (the system had to use the shared NO SLA queues in all environments—the system did not have any dedicated queues).

Data Consolidation and Standardization: Several other steps were implemented in the process to consolidate and standardize the results and ensure the end user is not overwhelmed with irrelevant results (e.g., historical data older than 5 years) or duplicate relationship records (e.g., NLP algorithm can extract an entity called Ford or Ford Motor Company, but essentially these two are the same and the standardized data should have one record only, not two).

Filtering out irrelevant data. Raw comments extracted from Newton that are older than 5 years are filtered out as well as certain common false positives (i.e. words extracted by the NLP process as entity names that are not true entities). RAFs of clients that are no longer customers of the organization or that have moved from the organization's Wholesale portfolio to the Retail portfolio are also filtered out. After these filters are applied, out of over 6.5 million records, there are 3.7 million records left with 1.1 million unique paragraphs and ~600,000 distinct entity names extracted by the NLP process.

The table below provides more details about the 1.1 million paragraphs extracted:

|  | Length of text (# of characters) |
|---|---|
| mean | 1326 |
| 25 percentile | 335 |
| 50 percentile | 833 |
| 75 percentile | 1768 |
| max | 20165 |

Creating Unique Relationship Pairs. The results from the NER, classifier and client matching models were merged and unique relationships pairs were created in a consolidated and standardized data set. This unique standardization process allowed us to reduce the raw number of records generated by the models by 57% and publish only meaningful and clean data to the end users.

Each relationship pair is identified within the dataset by a unique relationship identifier. The relationship identifier is either: A) the concatenation of the unique identifier of Party A and unique identifier of Party B, if the client matching model found a client match between the entity name extracted by the NLP process & a client; or B) the concatenation of the unique identifier of Party A and the entity name extracted by the NLP process, where a client match was not found.

All the risk assessment comments, from which the entity names were originally extracted, were merged for each unique relationship identifier so that the user has all the evidence in support of that relationship in one place.

Figure 14:
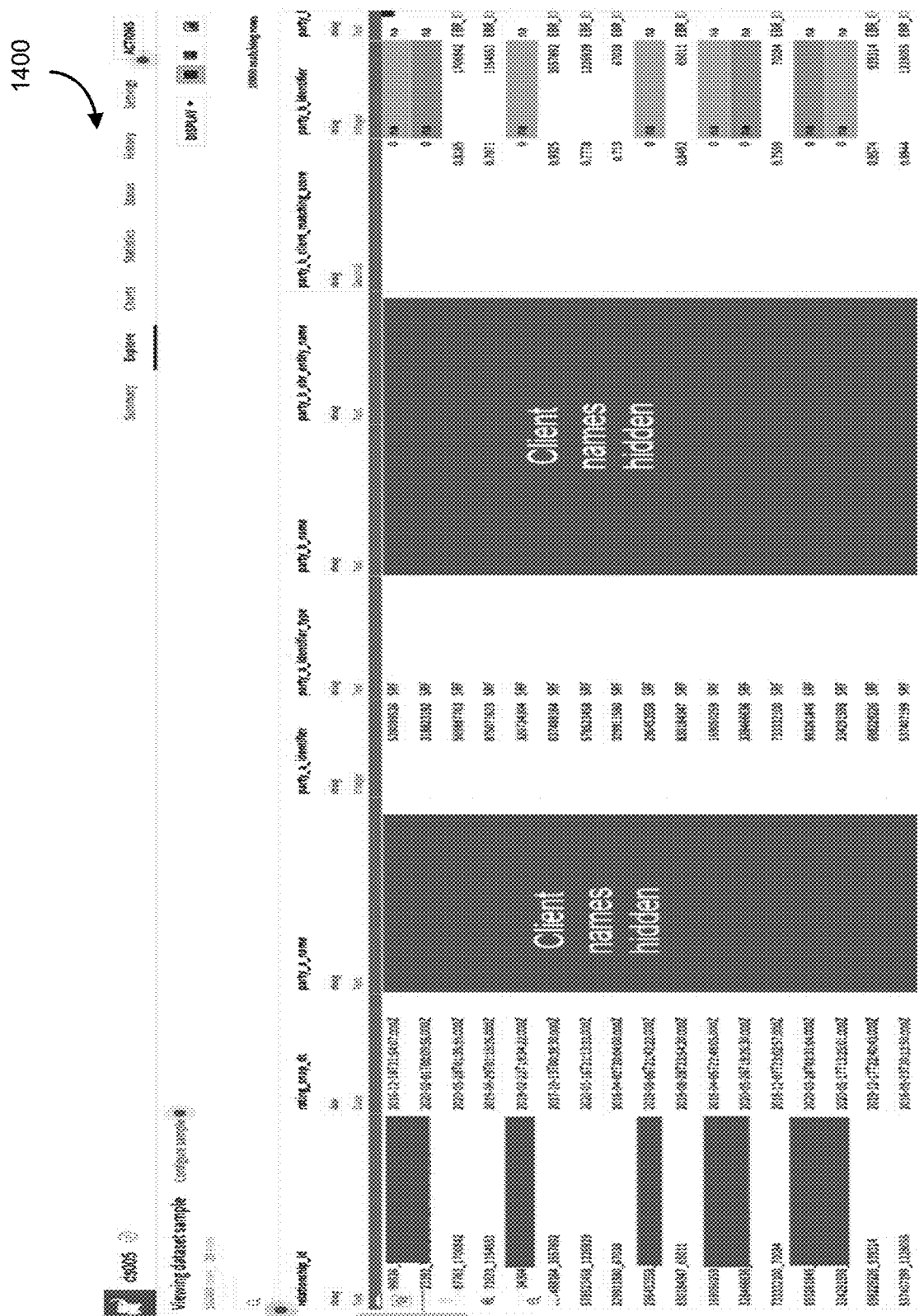
FIG. 14 is a screenshot that shows examples of relationship identifiers (relationship_id column), according to some embodiments.

FIG. 14 is a screenshot 1400 that shows examples of relationship identifiers (relationship_id column), according to some embodiments.

Removing Duplicate Records Due to Duplicate Legal Entity Names Sourced from Upstream Client Data Systems. The client data domain is one of the most complex to deal with. As organizations have evolved and acquired new businesses, the architecture around managing client data also became more complex. Over a dozen systems, for example, can be used for client onboarding and management, with some systems also acting as client data consolidators that provide merged client profiles.

There are cases in which the same legal name (the only feature used by our client matching logic) is provided by upstream client onboarding system, but with different client identifiers (for legitimate business reasons). These outliers however, can overcomplicate the client matching process and provide duplicate results to the end users. Every duplicate record sent by upstream systems can cause the model-generated results to grow exponentially.

For example, if one entity (Party B) has 1,000 identified relationships and this entity has duplicate legal entities in the source system (assume 100), then the number of records presented to the users would be 100,000—different relationship identifiers (as Party B identifier is different) but essentially the same legal name extracted from 1,000 comments only. For records for which a review of the model-generated results is required, 99% of these records would be considered "noise" in the data or duplicates from a reviewer's perspective; this is because in order to approve a relationship, the original comment from which the entity name was extracted needs to be reviewed as well as the other corresponding data points like a client's name & identifier. A streamlined client matching model that would remove such duplicates was implemented and ~35% of noise in the results was removed.

User Tagging Process. The standardized data set is used to generate the final user report that includes only relationships for the large exposure clients of interest in a particular month. The user reviews the model-generated results and tags the records by approving the true significant economic relationships. False positives are not approved and a rationale for decline is provided. All the feedback is then used as part of the model monitoring framework established to re-train models and ensure the model accuracy does not fall below established thresholds.

Figure 15:
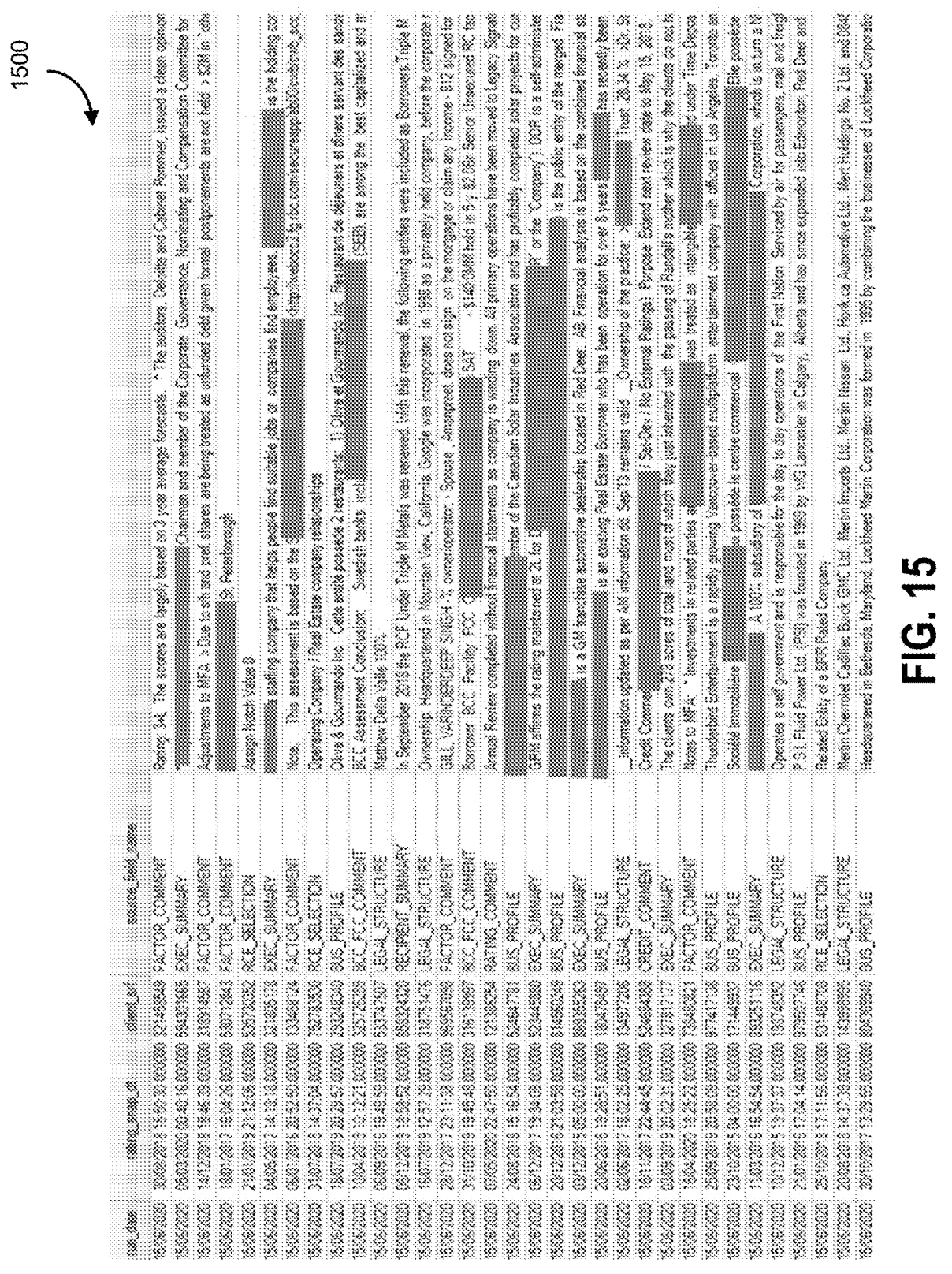
Figure 16:
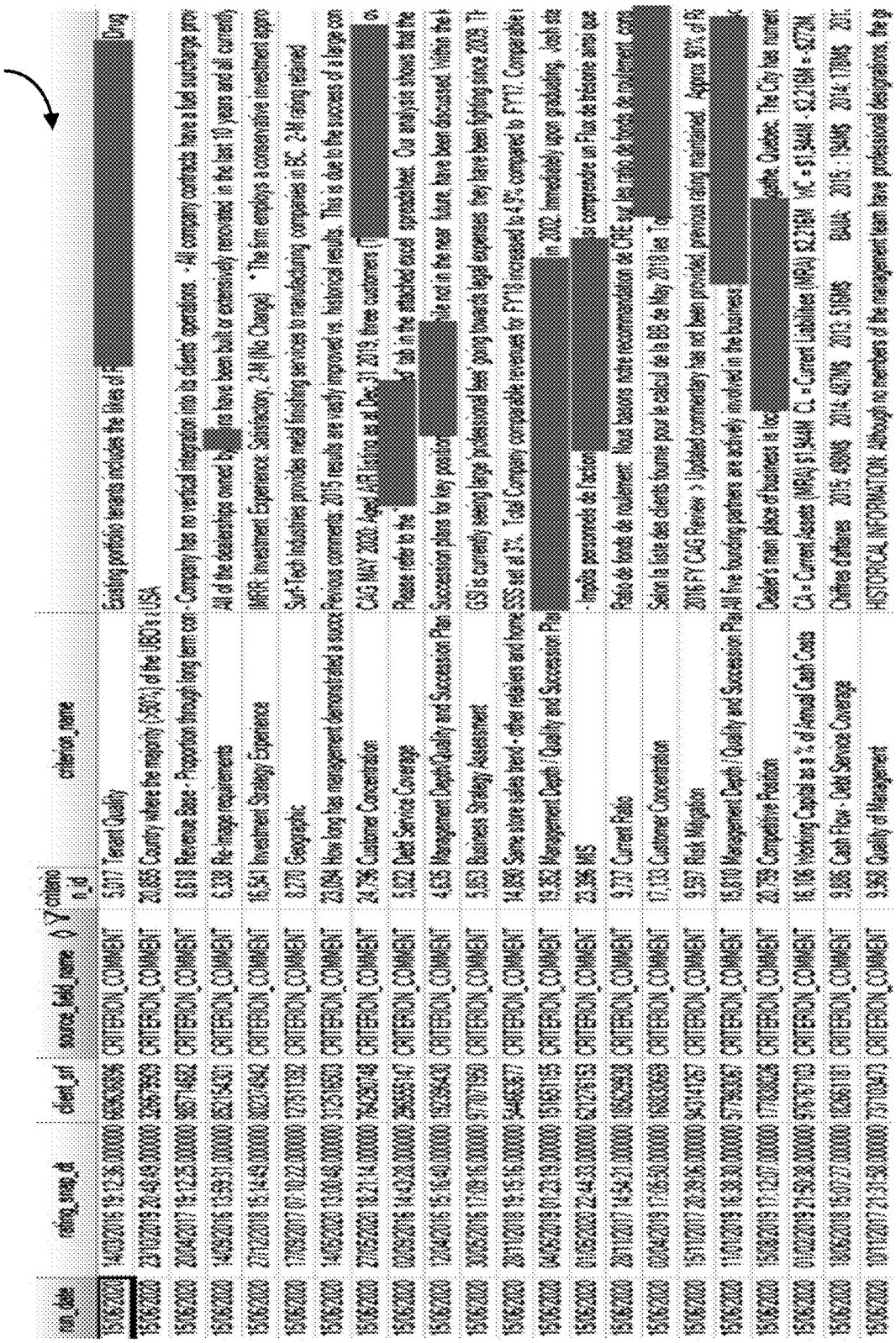

Inputs for the data flow include Newton RAF comments that were obtained from textual fields such as:
  Criterion Comment (i.e., comments related to a client's business strategy, financial strategy, quality of management, access to funds, customer/supplier diversification and many other criteria part of over 60 criteria papers used by GRM Credit to risk assess clients in each industry)
  Executive Summary
  Rating Comment
  Business Profile
  Credit Comment
  Rating Final Comment
  Model Selection Comments FIG. 15 and FIG. 16 provide sample textual fields and criteria, according to some embodiments. FIG. 15 shows at 1500 example types of textual fields, including comments, summaries, profiles, among others. FIG. 16 shows at 1600 various criteria coupled to textual comments.

Outputs for the data flow included data structures storing entity names extracted from Newton comments fields by the NLP Named Entity Recognition (NER) Stanford Model.

One of the following relationship types was assigned to each relationship pair (an entity pair=entity for which a RAF was written+entity extracted from comments by NLP model) identified by a machine learning classification model: (1) Significant Economic Relationship; (2) Non significant Economic Relationship; and (3) Other.

Figure 17:
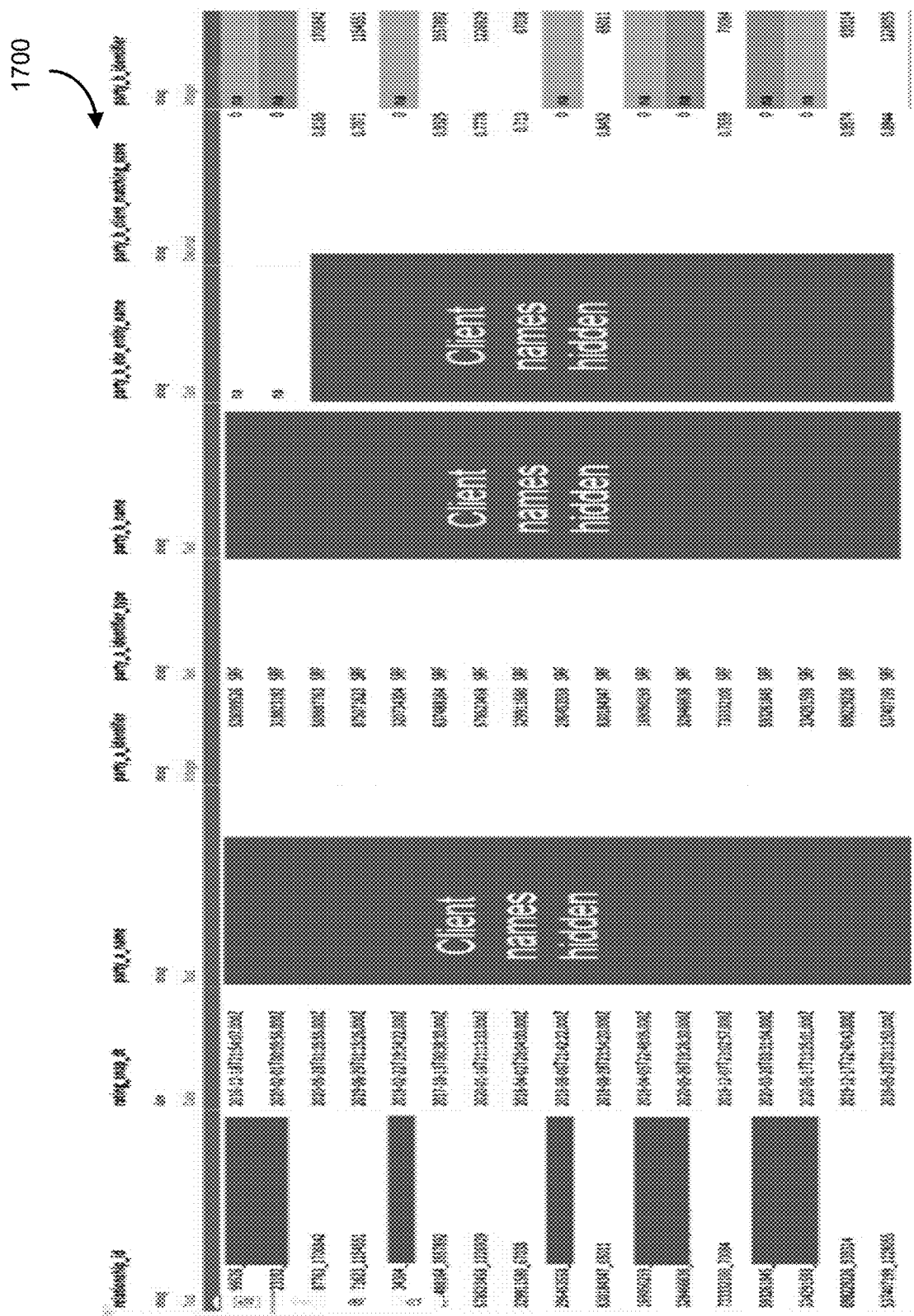
FIG. 17 provides sample data, according to some embodiments.

For each relationship classification, a predicted probability/confidence score was generated, and as well as a EBR client name matched to the entity name extracted by the NLP model and a similarity score. FIG. 17 provides at 1700 sample data, according to some embodiments. In the screenshot of 1700, a client matching score and identifier that can be utilized as a data output. As shown here, the score can range from 0-1 and can be normalized, but non-normalized and other types of scores are possible.

Challenge: the training data is highly imbalanced (most of the data labeled as "Others"). To make sure that the model was not biased toward the frequent class, oversampling was used and the class weights were adjusted in the training phase. An objective is to identify economic relationships for the Large Exposure Limits regulation published by Basel/ OSFI, for example, and the system described here, for example, can provide capability to allow risk managers to find information about wholesale clients to improve the risk monitoring process:
  Economic relationships
  Control relationships
  External data—annual/quarterly reports, 10Ks/10Qs etc.
  News articles
  The entity recognition model can be used to recognize entities in any unstructured data (e.g. 10Ks, news articles) and the client matching model can be used to match the unstructured data files to the relevant wholesale clients
  Expand functionality built for LEF to identify economic relationships between clients based on company fillings (not just Newton comments)

The AI models can run periodically (e.g., on a monthly basis) to extract economic relationships from the risk assessment comments in Newton and generate an end user report for the relevant large exposure clients.

FIG. 1B is a more detailed block schematic diagram 100B of an example data flow for interdependence detection between data objects, in accordance with some embodiments. The following is a legend of data flow being transferred between computing components. FIG. 1B includes example computing architecture and alternate, different, less, more, or variant versions are possible.

DS001 & DS002—Intermediary files created to facilitate the creation of DS003 without storing too much data in memory. DS001 contains all the risk assessment comments extracted from 5 Newton files (20+comment fields) as well as relevant client information extracted from the Newton CLIENT file. DS001 is an input file into the machine learning relationship classification model which generates DS002. DS001 and DS002 are purged after DS003 is generated.

DS003 (NLP Entity Recognition & Relationships Classification Output)—Results from the NLP entity recognition model as well as from the machine learning relationship classification model.

DS004 (Client Matching Output)—Results from the client matching model that matches entity names extracted by the NLP process to the wholesale client names published by EBR in the published_core file.

DS005 (Consolidated A1 Model-Generated Output)— Consolidated model-generated output file that includes data from DS003, DS004 and DS007. Column names and the file structure are also standardized.

DS006 (EBR Master Wholesale Client Data File)—File includes all the significant economic relationships approved by GRM Credit that need to be integrated with the control hierarchy downstream.

DS007 (Large Exposure Client List—LECL)—File that is provided by Enterprise Risk and includes single name entities with exposure >4% of the organization's Tier 1 Capital as well as all their underlying borrowers. (FY 2019—this is an End User Computing (EUC) file submitted via the Risk File Gateway)

DS008 (End-User LEF EI Report with Model-Generated Significant Relationships)—End user report that includes all the model-generated significant economic relationships that are related to the clients on the LECL. These relationships are reviewed and approved/not approved by GRM Credit LEF EI Approvers.

DS009 (Approved/Not-Approved Relationships)— Monthly file includes all the significant economic relationships approved OR not approved by GRM Credit. This file will also include any other relationships that need to be added manually by Enterprise Risk stakeholders if key ones are missed by the A1 models. (FY 2019—this is an End User Computing (EUC) file submitted via the Risk File Gateway)

DS010 (Historical Approved/Not-Approved Relationships)—Historical data set that includes all the monthly results available in DS009 as well as key data elements that show the effective start date and end date of each significant economic relationship required for LEF.

DS011 (NLP Non-Entity Words)—Static table which stores non-entity words (e.g. EBITDA, BRR) and will be used to filter out irrelevant records from DS001/DS003.

DS012 (NLP Entity Acronyms or Overwrites)—Static table which stores common acronyms or well-known names that are used instead of the legal name in the comments fields (e.g. The Federal National Mortgage Association is also known as Fannie Mae) and will be used to ensure the names/acronyms are replaced with the proper name so that the client matching algorithm returns a match with a high similarity score.

DS013 (Keywords for Tagging Paragraphs Extracted)—Static table which stores English and French keywords (e.g. franchise, dealership, supplier, customer, borrower etc.) which are used to tag the paragraphs extracted by the NLP process from the Newton comments fields. These keywords are used for enabling further analysis and searchability of the results returned.

Figure 18:
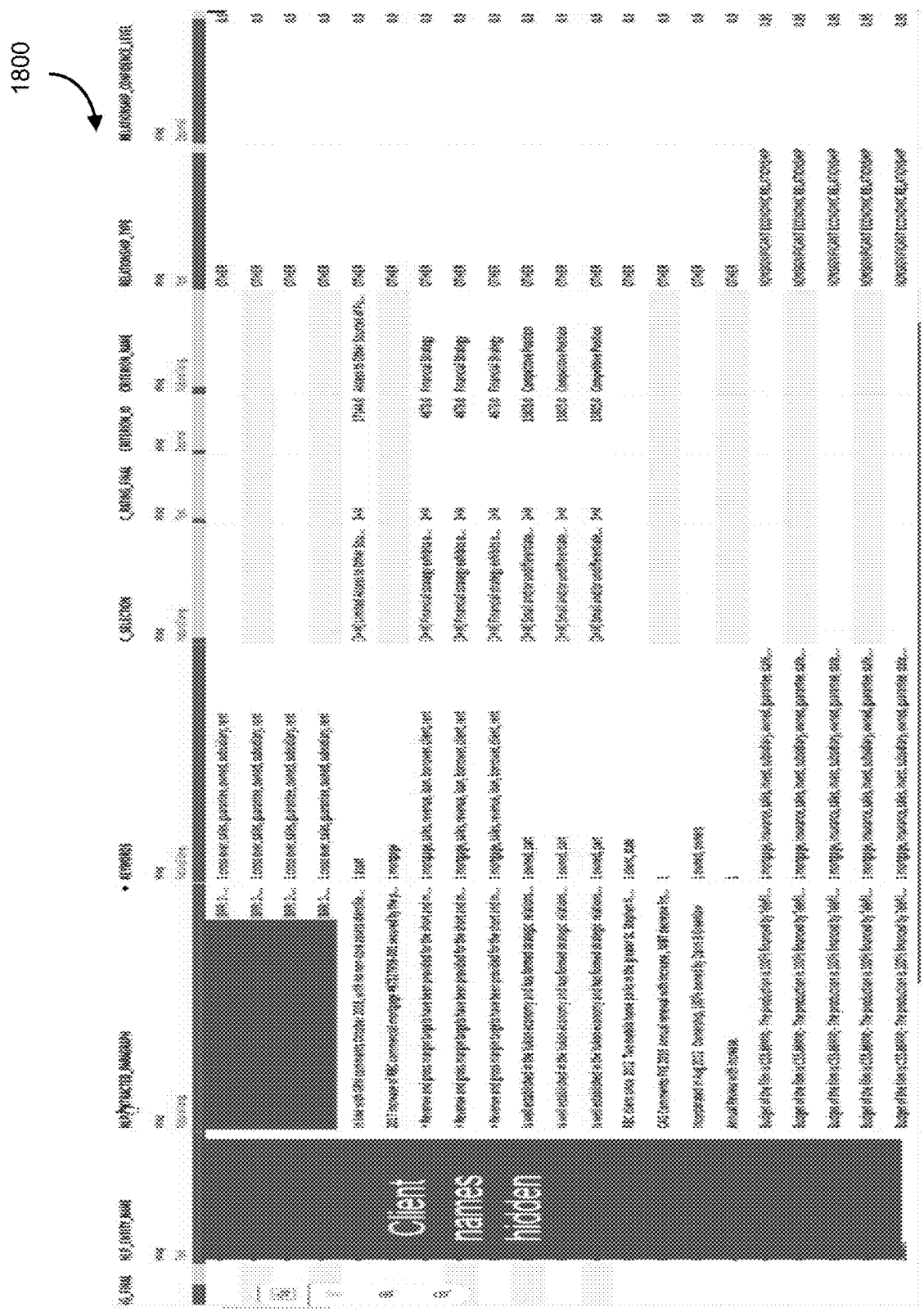
FIG. 18 is a screenshot that shows examples of keywords, according to some embodiments.

FIG. 18 is a screenshot 1800 that shows examples of keywords, according to some embodiments.

Counterparties that were identified as being economically interdependent based on the Newton data should be connected to the control hierarchy so entities can be grouped together based on both the control relationship and economic interdependence. Control relationships are those in which one entity has direct or indirect ownership, voting rights, Board or management representation (i.e., control) of a related entity of 50% or greater. These control relationships can be manually captured in some embodiments and are part of a structured data set.

Note that control relationships where the ownership is <50% can be extracted by the NLP process as such details are also mentioned in the Newton comments; however, in the first stage of development these relationships were classified as "Other".

Using this data for other purposes other than regulatory would require enhancements to the classifier model to take other key relationships into consideration such as the control relationships where the ownership is <50%. It is the first time the organization has access to such a rich dataset from which many types of relationships between its clients can be extracted. The current output of the NLP/machine learning tool is a large scale network with each entity encoded as a node and the links between the nodes encoding the significance of their relationship.

These outputs can be augmented into an exposure graph which makes it possible for the first time, to experiment with the models of credit contagion over networks on real data. The Network Theory approach can be applied to credit risk processes to create networks of relationships, estimate the value of a network and show the impact on this value should an entity (or node) on the network become insolvent or experience financial difficulties.

Figure 2:
FIG. 2 is an example process diagram showing steps for estimating economic dependencies, according to some embodiments.

FIG. 2 is an example process diagram 200 showing steps for estimating economic dependencies, according to some embodiments.

Client classification attributes, for example, in an electronic business record system, can be used to generate sector industry classification details for example or use additional AI capabilities to determine the relationship type (e.g., customer, supplier etc.), and the electronic business record system can indicate if a named entity is a client of a particular financial institution.

As shown in FIG. 2, the RAF is processed to extract entity names (e.g., using a natural language processing model), and the words of the text are parsed to classify significant economic relationships (e.g., by a classifier data model architecture that is being trained by a machine learning engine).

Figure 3:
FIG. 3 is a table showing example data sets, according to some embodiments.
Figure 4:
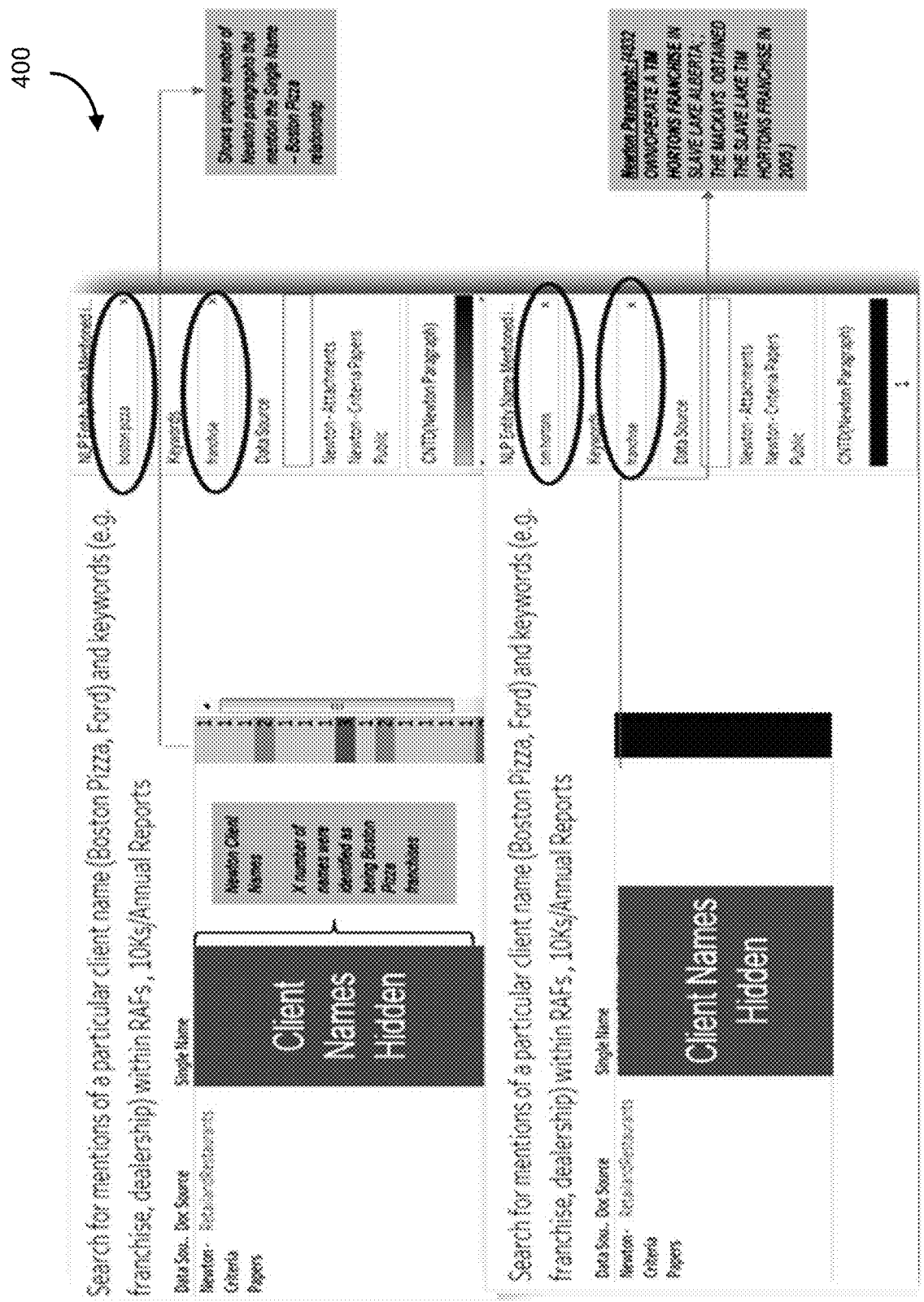
FIG. 4 is an example data set diagram showing NLP query results, according to some embodiments.

FIG. 3 is a table showing example data sets, according to some embodiments. FIG. 4 is an example data set diagram showing NLP query results, according to some embodiments.

Those screenshots show examples of how to identify entities that are related to Clients for which the risk assessments were written in Newton (the ones for which the names are hidden) based on the data we extracted just using the NLP process and some basic keyword tagging.

FIGS. 5-8 are example data set diagram showing NLP query results, according to some embodiments.

Figure 5:
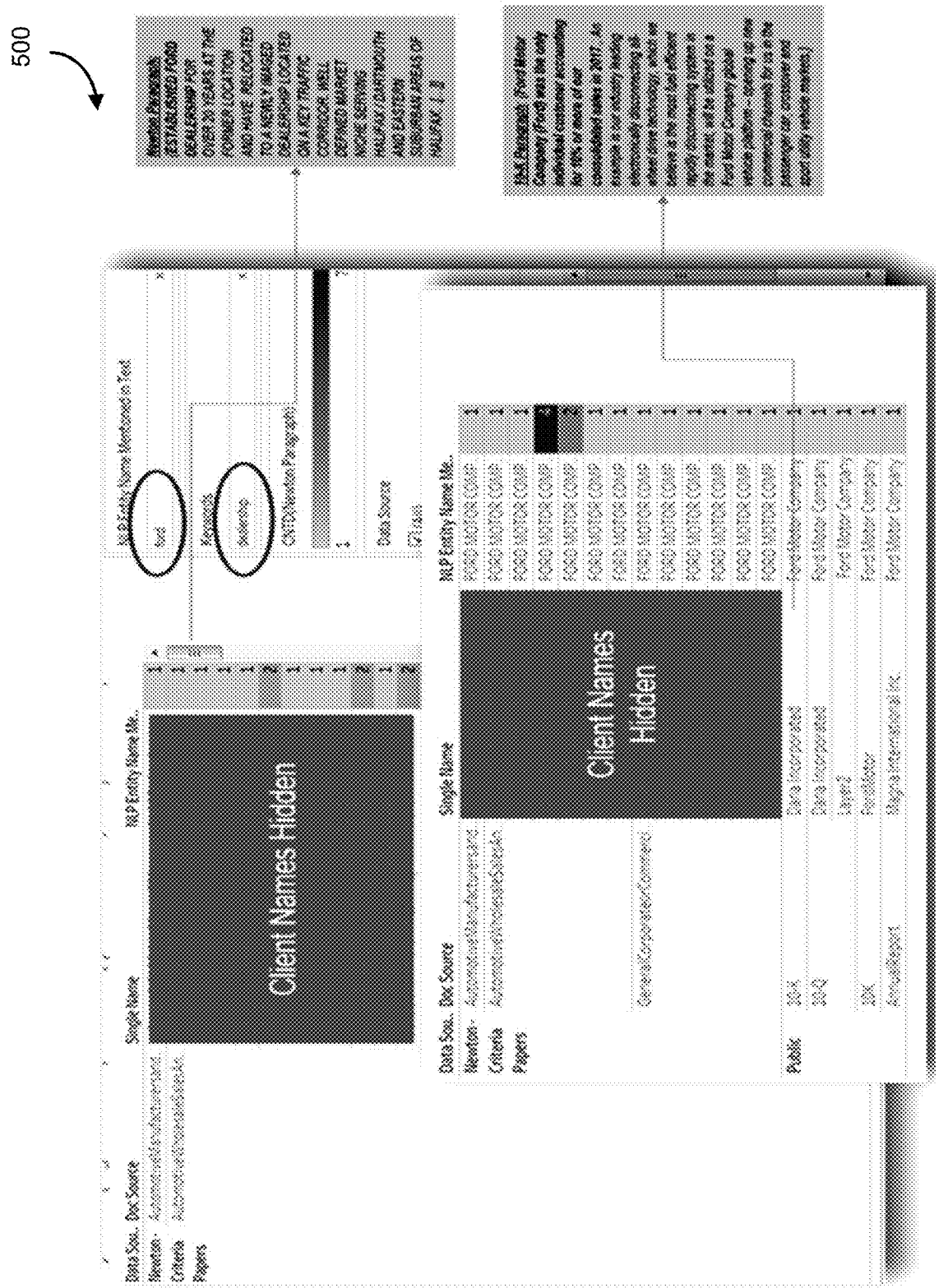
FIG. 5 is an example data set diagram showing NLP query results, according to some embodiments.

FIG. 5 is a diagram 500 that shows all Boston Pizza franchises identified, 2nd one shows all Ford dealerships etc. So one could have, for example, entity 12345 Quebec Inc. that is a customer of a financial organization and risk-assessed in Newton, for example.

The NLP process "reads" the Executive Summary section of that entity's risk assessment and identifies the entity name "Boston Pizza". Then the system extracts the corresponding paragraphs and determine whether the word "franchise" is also mentioned in the text. If so, by conducting a search on the data similar to that shown on the screenshot, the system obtains a list of all Boston Pizza franchises, including 12345 Quebec Inc.

Currently, in the first model-generated output published to users (DS003) there are 1,304 relationships extracted for "Boston Pizza". In the consolidated data set (DS005), after the data standardization steps are applied, there are 444 unique relationships between "Boston Pizza" and other entities/franchises.

Figure 6:
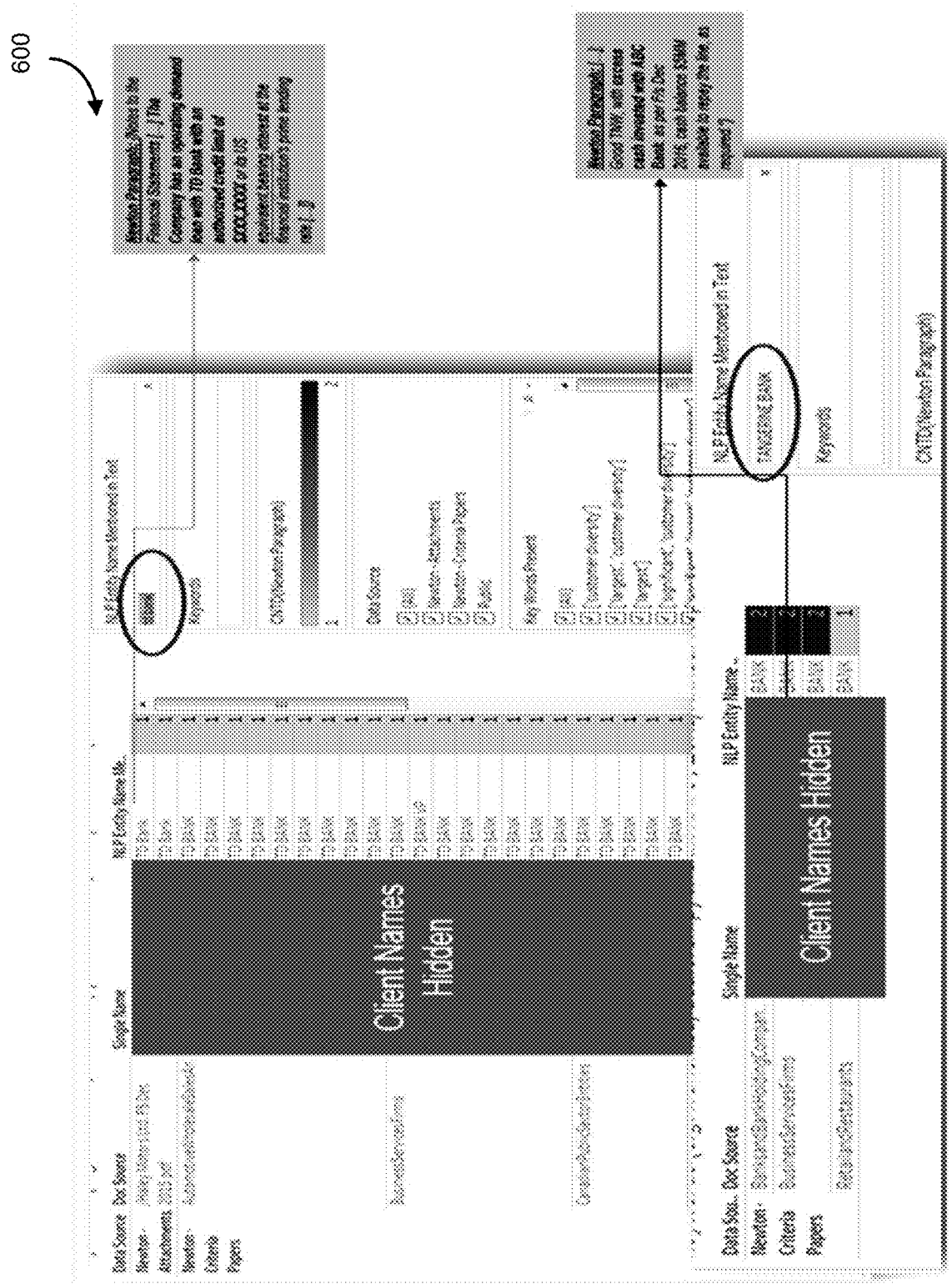
FIG. 6 is an example data set diagram showing NLP query results, according to some embodiments.
Figure 7:
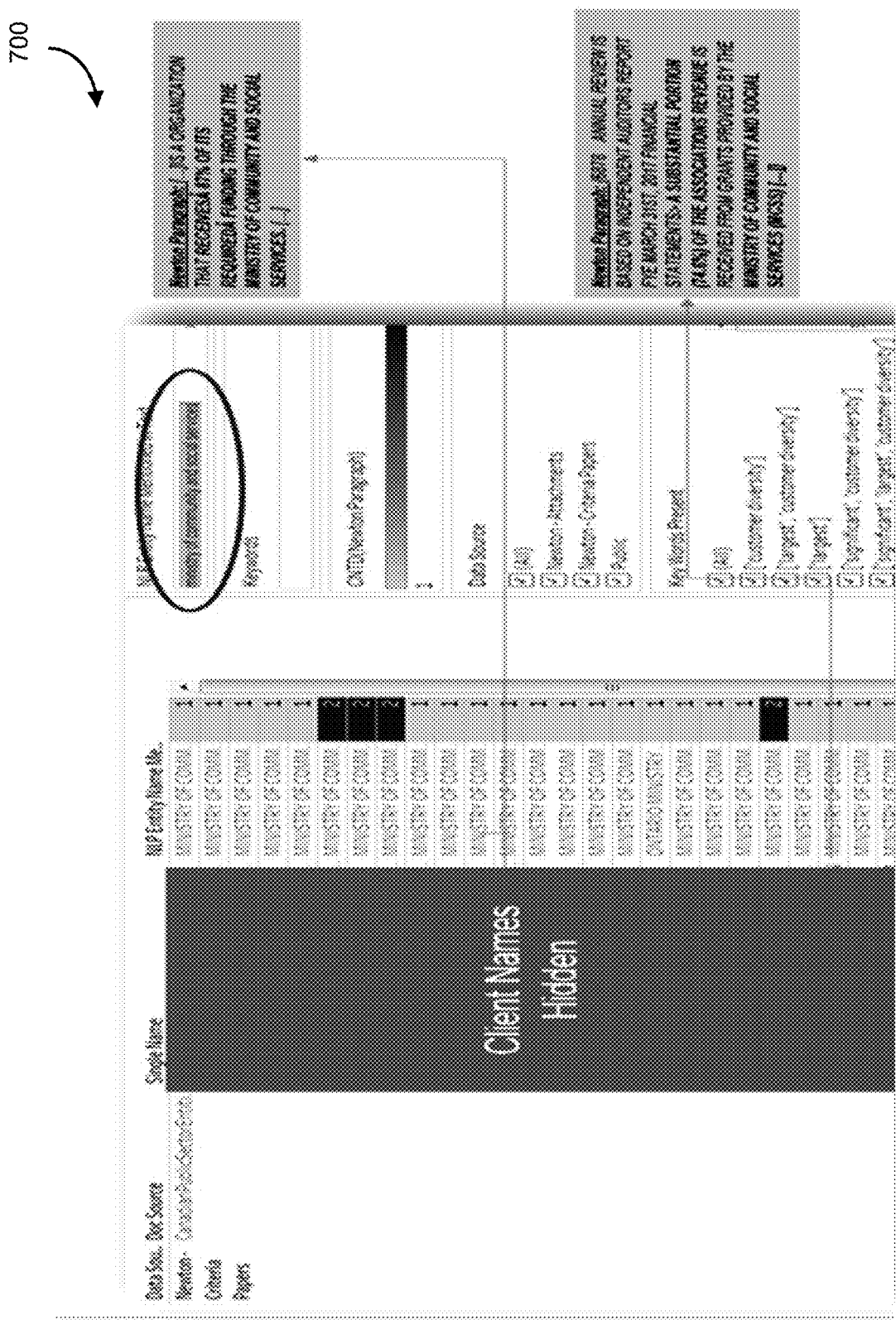
FIG. 7 is an example data set diagram showing NLP query results, according to some embodiments.

In FIG. 6, diagram 600 shows that an entity name may include a specific financial institution, alongside text indicative of a type of financial relationship. A similar aspect is shown in diagram 700 of FIG. 7, in relation to other types of entities (e.g., a gov't ministry in this example).

Figure 8:
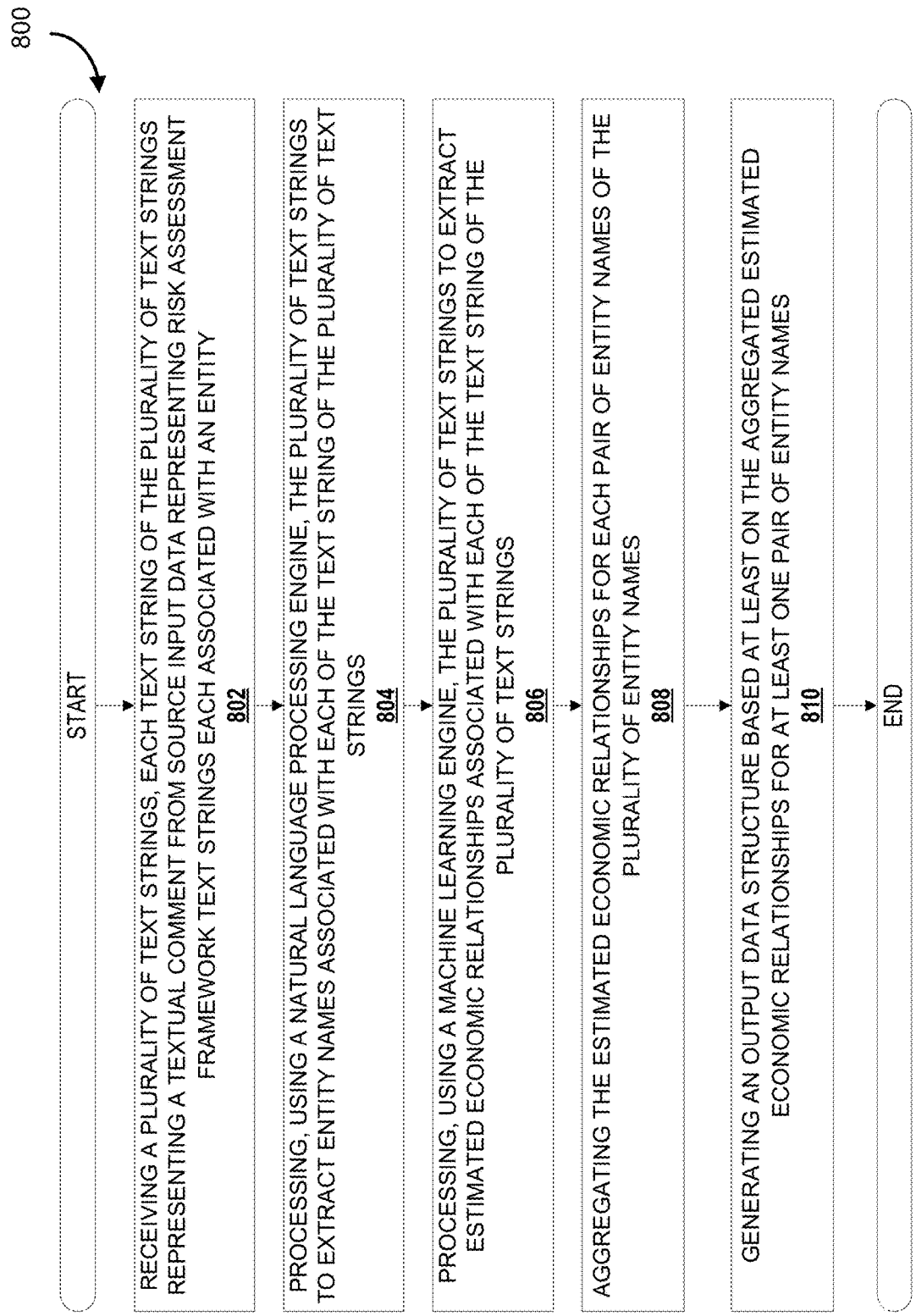
FIG. 8 is an example method diagram showing a method for interdependence detection between data objects, according to some embodiments.

FIG. 8 is a method diagram 800 showing example workflow steps, according to some embodiments.

In 800, a method for generating predictions associated with interdependence detection between a plurality of data objects, each data object of the plurality of data objects corresponding to an entity name is provided. The method 800 can include the step of 802 receiving a plurality of text strings, each text string of the plurality of text strings representing a textual comment from source input data representing risk assessment framework text strings each associated with an entity, 804 processing, using a natural language processing engine, the plurality of text strings to extract entity names associated with each of the text string of the plurality of text strings; 806 processing, using a machine learning engine, the plurality of text strings to extract estimated economic relationships associated with each of the text string of the plurality of text strings, the estimated economic relationships identified between at least two different entity names; 808 aggregating the estimated economic relationships for each pair of entity names of the plurality of entity names, the aggregated estimated economic relationships indicative of potential interdependence between the pair of entity names; and 810 generating an output data structure based at least on the aggregated estimated economic relationships for at least one pair of entity names.

Figure 9:
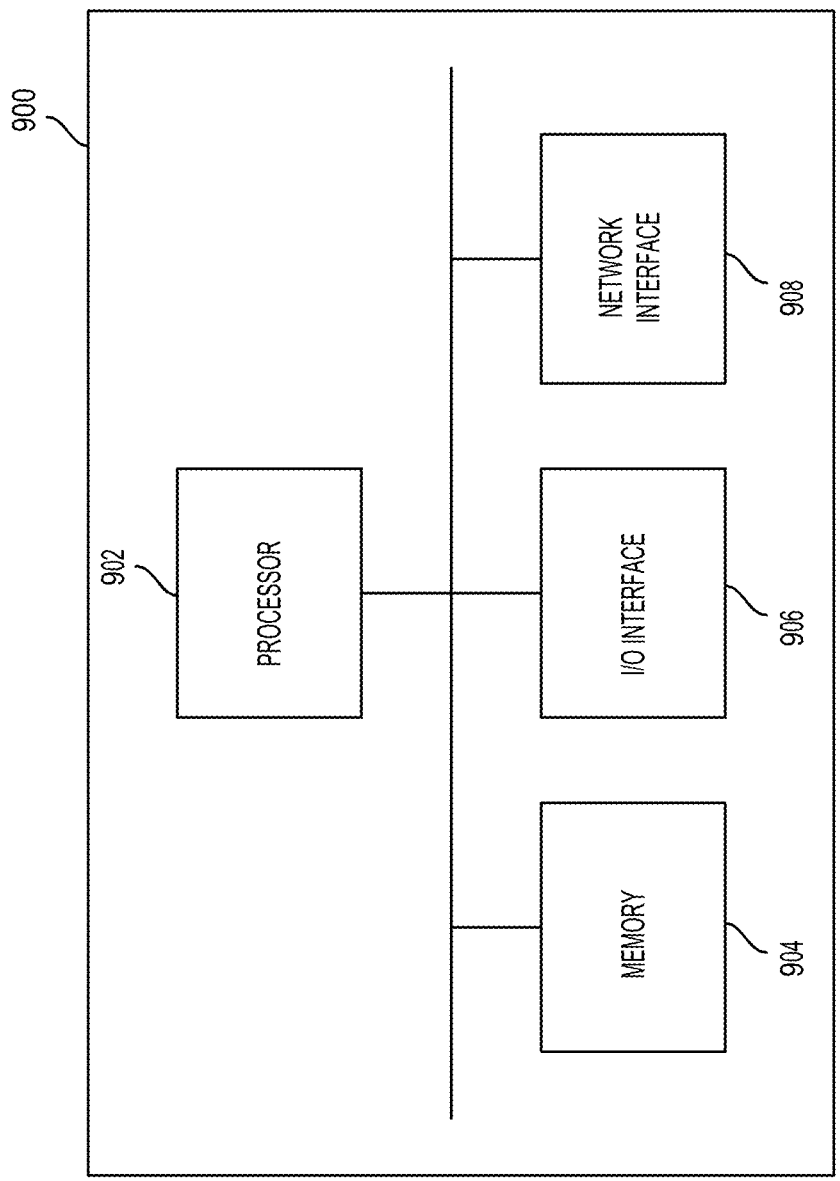
FIG. 9 is a diagram of an example computing device configured for interdependence detection between data objects, according to some embodiments.

FIG. 9 is a diagram of an example computing device configured for interdependence detection between data objects, according to some embodiments.

There is provided a schematic diagram of computing device 900, exemplary of an embodiment. As depicted, computing device 900 includes at least one processor 902, memory 904, at least one I/O interface 906, and at least one network interface 908. The computing device 900 is configured as a machine learning server adapted to dynamically maintain one or more machine learning engines or natural language processing engines.

Each processor 902 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 904 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 906 enables computing device 900 to interconnect with one or more input devices, such as a keyboard, mouse, camera, touch screen and a microphone, or with one or more output devices such as a display screen and a speaker.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

Processes, machines, manufacture, compositions of matter, means, methods, or steps, presently existing or later to be developed, that perform substantially the same function or achieve substantially the same result as the corresponding embodiments described herein may be utilized and are contemplated.

As can be understood, the examples described above and illustrated are intended to be exemplary only.

What is claimed is:

1. A computer system providing a computer tool for automatically generating predictions associated with interdependence detection between a plurality of data objects based on received unstructured text, each data object of the plurality of data objects corresponding to an entity name, the system comprising:

a data receiver configured to receive a plurality of text strings, each text string of the plurality of text strings representing a textual comment from source input data representing risk assessment framework text strings each associated with an entity;

a computer processor operating in conjunction with computer memory, the computer processor configured to:
  process, using a natural language processing engine, the plurality of text strings to extract entity names associated with each of the text string of the plurality of text strings;
  process, using a machine learning engine, the plurality of text strings to extract estimated economic relationships associated with each of the text string of the plurality of text strings, the estimated economic relationships identified between at least two different entity names;
  aggregate the estimated economic relationships for each pair of entity names of the plurality of entity names, the aggregated estimated economic relationships indicative of potential interdependence between the pair of entity names; and
  generate an output data structure based at least on the aggregated estimated economic relationships for at least one pair of entity names, the output data structure including a data object having linkages between the at least one pair of entity names to form a group of connected counterparties;
  wherein the machine learning engine converts portions of the plurality of text strings representing the extracted estimated economic relationships into vector representations, the estimated economic relationships extracted from numerical tokens extracted from the plurality of text strings, the estimated economic relationships stored as additional rows or columns in an expanded representation of the source input data associated with an economic relationship label, a confidence level, and a list of feature words;
  wherein the vector representations are pre-processed during generation to stem words to root forms of the words, to remove stop words, and to remove words that either appear often in the text or rarely in the text;
  wherein the vector representations are based at least on term frequency—inverse document frequency representations having at least a first portion representing a term frequency indicative of how often a word appears in a comment text string and a second portion representing a document frequency which is determined by dividing a total number of comments divided by how many comments the word appears in and conducting a natural logarithm of results of the division; and
  wherein a hyperparameter for generating the term frequency—inverse document frequency representations is optimized by the machine learning engine.

2. The system of claim 1, wherein the natural language processing is conducted using a Stanford Named Entity Recognizer model data architecture that is adapted to identify variants of entity names described in the plurality of text strings.

3. The system of claim 1, wherein the machine learning engine utilizes decision trees.

4. The system of claim 3, wherein the hyperparameter being optimized is a depth of the decision trees utilized by the machine learning engine.

5. The system of claim 4, wherein a second machine learning engine is utilized as an interpretable white-box estimator trained against the machine learning engine as a black-box estimator.

6. The system of claim 5, wherein the white-box estimator is trained using a new data set generated using perturbed samples from an original data set including the plurality of text strings.

7. The system of claim 5, wherein the estimated economic relationships are generated by a classifier engine that is adapted to append metadata to the vector representations based on a classification data model architecture including at least one of economic relationship label, confidence level, and a list of important feature words, the appended vector representations utilized to generate the output data structure.

8. The system of claim 1, wherein the output data structure is cross referenced against client names stored in an enterprise business record data structure using a cosine similarity algorithm to generate estimated high exposure lists for the client names stored in the enterprise business record data structure.

9. The system of claim 8, wherein a cross join is used for matching the client names against the extracted entity names.

10. The system of claim 9, wherein the output data structure is pre-filtered to remove candidate pairs below a threshold value of cosine similarity.

11. A method for using a computer tool to automatically generate predictions associated with interdependence detection between a plurality of data objects based on receiving unstructured text, each data object of the plurality of data objects corresponding to an entity name, the method comprising:
receiving a plurality of text strings, each text string of the plurality of text strings representing a textual comment from source input data representing risk assessment framework text strings each associated with an entity;
processing, using a natural language processing engine, the plurality of text strings to extract entity names associated with each of the text string of the plurality of text strings;
processing, using a machine learning engine, the plurality of text strings to extract estimated economic relationships associated with each of the text string of the plurality of text strings, the estimated economic relationships identified between at least two different entity names;
aggregating the estimated economic relationships for each pair of entity names of the plurality of entity names, the aggregated estimated economic relationships indicative of potential interdependence between the pair of entity names; and
generating an output data structure based at least on the aggregated estimated economic relationships for at least one pair of entity names, the output data structure including a data object having linkages between the at least one pair of entity names to form a group of connected counterparties;
wherein the machine learning engine converts portions of the plurality of text strings representing the extracted estimated economic relationships into vector representations, the estimated economic relationships extracted from numerical tokens extracted from the plurality of text strings, the estimated economic relationships stored as additional rows or columns in an expanded representation of the source input data associated with an economic relationship label, a confidence level, and a list of feature words;
wherein the vector representations are pre-processed during generation to stem words to root forms of the words, to remove stop words, and to remove words that either appear often in the text or rarely in the text;
wherein the vector representations are based at least on term frequency—inverse document frequency representations having at least a first portion representing a term frequency indicative of how often a word appears in a comment text string and a second portion representing a document frequency which is determined by dividing a total number of comments divided by how many comments the word appears in and conducting a natural logarithm of results of the division; and
wherein a hyperparameter for generating the term frequency—inverse document frequency representations is optimized by the machine learning engine.

12. The method of claim 11, wherein the natural language processing is conducted using a Stanford Named Entity Recognizer model data architecture that is adapted to identify variants of entity names described in the plurality of text strings.

13. The method of claim 11, wherein the machine learning engine utilizes decision trees.

14. The method of claim 13, wherein the hyperparameter being optimized is a depth of the decision trees utilized by the machine learning engine.

15. The method of claim 14, wherein a second machine learning engine is utilized as an interpretable white-box estimator trained against the machine learning engine as a black-box estimator.

16. The method of claim 15, wherein the white-box estimator is trained using a new data set generated using perturbed samples from an original data set including the plurality of text strings.

17. The method of claim 15, wherein the estimated economic relationships are generated by a classifier engine that is adapted to append metadata to the vector representations based on a classification data model architecture including at least one of economic relationship label, confidence level, and a list of important feature words, the appended vector representations utilized to generate the output data structure.

18. The method of claim 11, wherein the output data structure is cross referenced against client names stored in an enterprise business record data structure using a cosine similarity algorithm to generate estimated high exposure lists for the client names stored in the enterprise business record data structure.

19. The method of claim 18, wherein a cross join is used for matching the client names against the extracted entity names.

20. A non-transitory computer readable medium storing machine interpretable instructions, which when executed, cause a processor to perform a method for automatically generating predictions associated with interdependence detection between a plurality of data objects based on received unstructured text, each data object of the plurality of data objects corresponding to an entity name, the method comprising:
receiving a plurality of text strings, each text string of the plurality of text strings representing a textual comment from source input data representing risk assessment framework text strings each associated with an entity;

processing, using a natural language processing engine, the plurality of text strings to extract entity names associated with each of the text string of the plurality of text strings;

processing, using a machine learning engine, the plurality of text strings to extract estimated economic relationships associated with each of the text string of the plurality of text strings, the estimated economic relationships identified between at least two different entity names;

aggregating the estimated economic relationships for each pair of entity names of the plurality of entity names, the aggregated estimated economic relationships indicative of potential interdependence between the pair of entity names; and generating an output data structure based at least on the aggregated estimated economic relationships for at least one pair of entity names, the output data structure including a data object having linkages between the at least one pair of entity names to form a group of connected counterparties;

wherein the machine learning engine converts portions of the plurality of text strings representing the extracted estimated economic relationships into vector representations, the estimated economic relationships extracted from numerical tokens extracted from the plurality of text strings, the estimated economic relationships stored as additional rows or columns in an expanded representation of the source input data associated with an economic relationship label, a confidence level, and a list of feature words;

wherein the vector representations are pre-processed during generation to stem words to root forms of the words, to remove stop words, and to remove words that either appear often in the text or rarely in the text;

wherein the vector representations are based at least on term frequency—inverse document frequency representations having at least a first portion representing a term frequency indicative of how often a word appears in a comment text string and a second portion representing a document frequency which is determined by dividing a total number of comments divided by how many comments the word appears in and conducting a natural logarithm of results of the division; and wherein a hyperparameter for generating the term frequency—inverse document frequency representations is optimized by the machine learning engine.

* * * * *